United States Patent [19]

Cherbuy

[11] Patent Number: 4,901,087

[45] Date of Patent: Feb. 13, 1990

[54] DEVICE FOR FORMING LATENT MAGNETIC IMAGES ON THE RECORDING ELEMENT OF A MAGNETOGRAPHIC PRINTER

[75] Inventor: Bernard Cherbuy, Essert, Belfort, France

[73] Assignee: Bull S.A., Paris, France

[21] Appl. No.: 330,469

[22] Filed: Mar. 30, 1989

[51] Int. Cl.$^4$ ............................................. G01H 15/00
[52] U.S. Cl. .................................. 346/74.2; 346/74.5
[58] Field of Search ..................... 346/74.2, 74.5, 74.7, 346/155, 139 C; 358/298, 301; 400/119

[56] References Cited

U.S. PATENT DOCUMENTS

| | | | |
|---|---|---|---|
| 4,312,045 | 1/1982 | Jean et al. ............................ | 346/74.2 |
| 4,525,724 | 6/1985 | Franaszck et al. ................... | 346/74.5 |
| 4,610,527 | 9/1986 | Cherbuy et al. ..................... | 346/74.2 |
| 4,739,342 | 4/1988 | Dove et al. .......................... | 346/74.5 |

FOREIGN PATENT DOCUMENTS 0142446  12/1984  European Pat. Off. ............ 346/74.2
2443335   7/1980  France ............................. 346/74.2

OTHER PUBLICATIONS

Patent Abstracts of Japan, vol. 8, No. 224 (M-331) (1661) 13 Oct. 1984 & JP-A 59-106 976.

*Primary Examiner*—Arthur O. Evans
*Attorney, Agent, or Firm*—Kerkam, Stowell, Kondracki & Clarke

[57] ABSTRACT

The invention relates to a device for forming latent magnetic images on the recording element of a magnetographic printer.

A plurality of magnetic heads (such as Y1, X1, Y2, and so forth), of different sizes are provided which can be displaced along the surface of the recording element (11) and which are excited selectively in such a manner as to form magnetized points of different sizes on this surface, which are centered along the lines (D1, D2, D3 and so forth), this excitation being effected such that the magnetized points thus formed on the surface do not overlap.

25 Claims, 15 Drawing Sheets

| FIG.3 | FIG.3A | FIG.3B |
|---|---|---|
| | FIG.3C | FIG.3D |

| FIG.4 | FIG.4A | FIG.4B |
|---|---|---|
| | FIG.4C | FIG.4D |

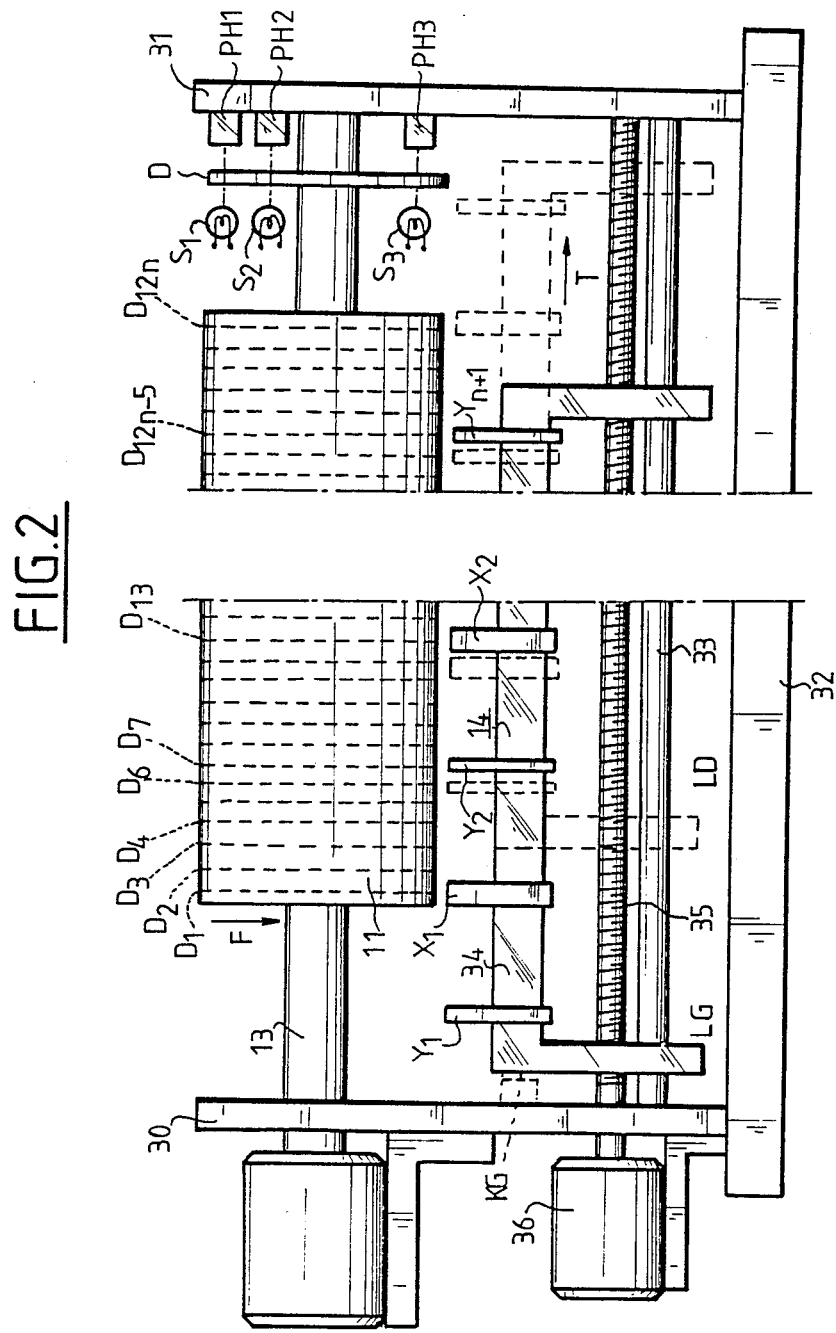

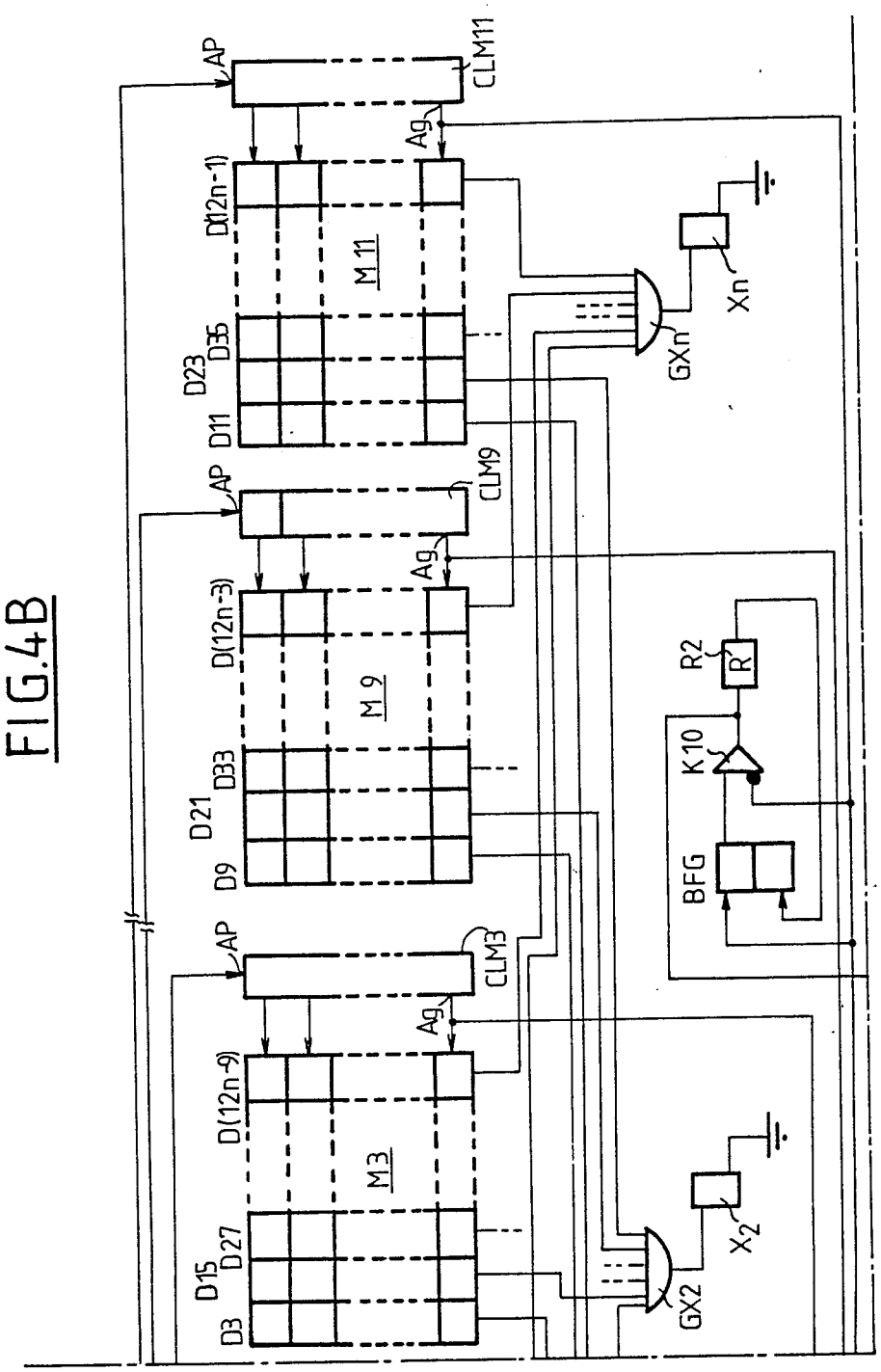

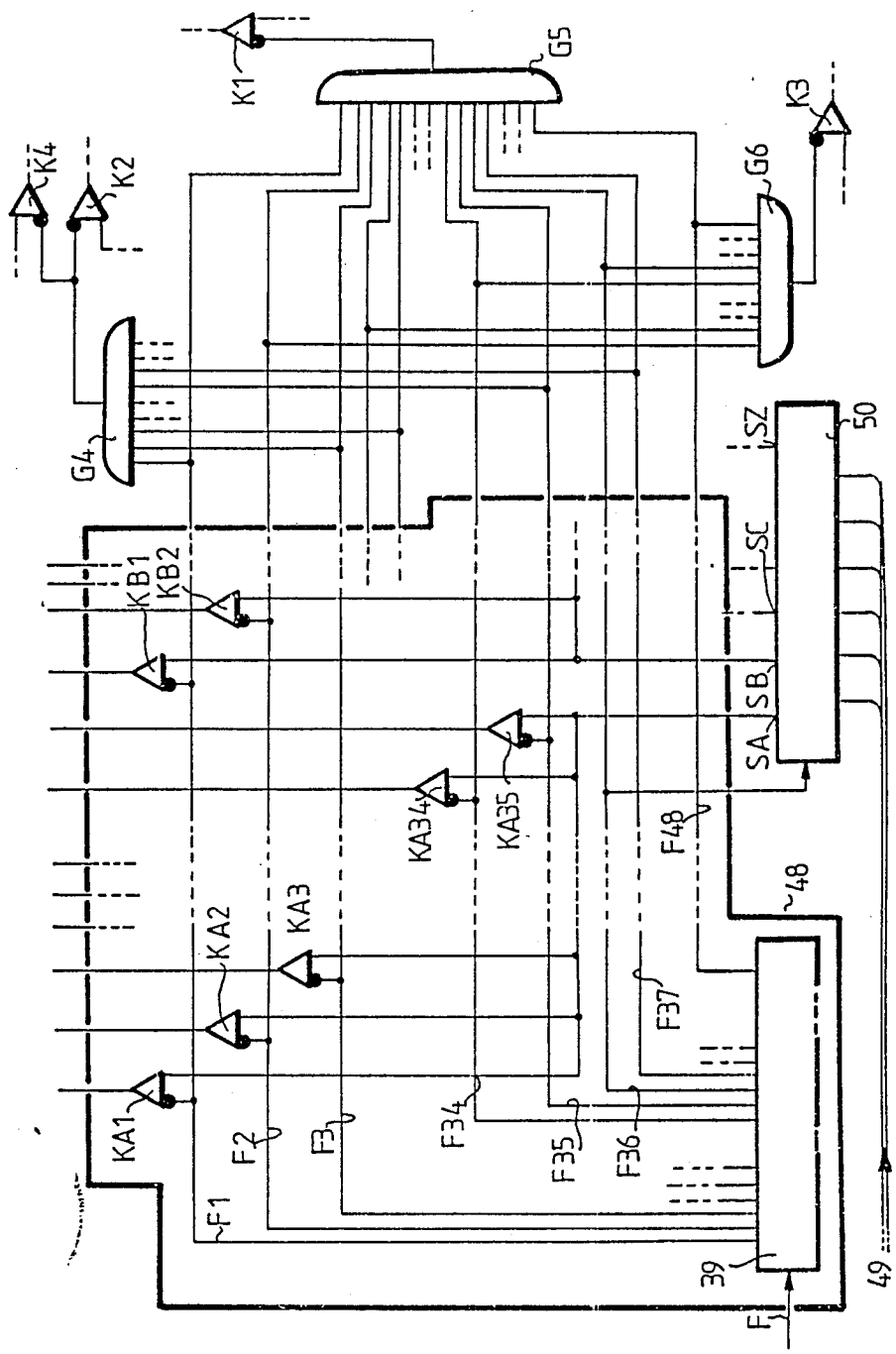

DEVICE FOR FORMING LATENT MAGNETIC IMAGES ON THE RECORDING ELEMENT OF A MAGNETOGRAPHIC PRINTER

FIELD OF THE INVENTION

The present invention relates to a device for forming latent magnetic images on the recording element of a magnetographic printer.

BACKGROUND OF THE INVENTION

Magnetographic printing machines are known which make it possible, in response to the reception of electrical signals from a control unit, to form images, such as images of characters, on a printing carrier, typically a tape or a sheet of paper. In these printing machines, which are similar to those described and shown in U.S. Pat. No. 3,161,544, printing of the images is done, first, on the basis of the signals received, by forming a latent magnetic image on the surface of a magnetic recording element, typically in the form of a rotating drum or endless belt, this recording element being coated with a film of magnetic material. The latent magnetic image is then developed, or in other words made visible, with the aid of a powdered developer. Because it comprises fine particles of thermoplastic resin including magnetic particles and pigments, the developer is attracted only by the regions of the recording element on which the latent image has been recorded; the developer then forms an image in powder on the surface of the element. Subsequently this image in powder is transferred to the printing carrier.

To permit forming the latent magnetic image on the surface of the recording element, these machines are provided with a recording device known as a transducer, which includes one or more magnetic recording heads, in proximity with which the recording element is displaced. Each of these heads, whenever it is excited for a brief moment by an electrical current of suitable intensity, generates a magnetic field, the effect of which is to create magnetized domains of small dimensions on the surface of the recoring element moving past them; these virtually point-shaped domains are typically known as magnetized points.

The set of these magnetized points comprises the latent magnetic image. The portion of the surface of the recording element that thus passes before each head is typically known as the information recording track, and in general the recording element includes a plurality of tracks that can be subjected to recording, either individually in the course of successive recording operations, or simultaneously in the course of a single operation.

In magnetographic printing machines, each of the printed characters is the product of the printing on the printing carrier of a set of points located inside a matrix; each of these points is obtained by the transfer of particles of developer previously deposited onto a corresponding magnetized point of the recording element onto the carrier. Since the magnetized points that are formed on the recording element are always of very small dimensions, for instance on the order of 66 $\mu$m, and the distance (from center to center) that separates two contiguous points is slightly greater than the size of these points, for instance on the order of 100 microns, it has been confirmed that when using these points to produce standard characters, having a height equal to one-tenth of an inch (that is, approximately 2.54 mm), it was quite difficult to form certain characters having curved or oblique lines in their configuration, such as the characters "V", "W", "X", "Y", "M", "C", "3", and "7".

In fact, considering the relatively wide spacing between two adjacent points located on an oblique line, the curved or oblique portions of these characters always appear broken up and not as dark. Naturally, to obtain lines that are thicker and hence are more visible it is known that these lines can be reinforced by using more than one contiguous lines of points to form each of these lines, instead of only one line of points. For example, to make the oblique line of the character "N", two or three contiguous oblique lines of points can be used. However, this procedure proves to be not entirely satisfactory, because the characters having curved or oblique lines that are obtained thereby, although quite legible, still look more or less deformed.

To overcome this disadvantage, the attempt has been made to utilize a solution described in French Patent No. 2.042.947, which comprises reducing the spacing between the lines of points, without also modifying the size of the points or the dimensions of the characters. However, although this solution made it possible to improve the aesthetic qualities of the characters, it proved to be totally unadapted to the case of magnetographic printers, because it necessarily meant that the magnetized points that are formed on the recording element had to be overlapped, which reduced the force of magnetic attraction in the central portion of each of the zones formed by the overlap of these points considerably, and thus led to insufficient inking of the characters.

Naturally this defect can be eliminated by reducing the size of the points, taking into account the reduction in spacing between the lines of points, so as to eliminate the overlapping effect, but that procedure necessitates further increasing the number of lines of points constituting each of the lines of the characters, and so necessitates a major increase in the number of circuits serving to form the points, as well as in the equipment assuring the electrical supply to the circuits; the resultant printing machine is particularly bulky and expensive. Moreover, this kind of procesure does not enable satisfactory correction of the deformation of the characters.

OBJECT AND SUMMARY OF THE INVENTION

The present invention overcomes these disadvantages and proposes a device which makes it possible to form latent magnetic images on the recording element of a magnetographic printer and which to this end uses magnetized points of different sizes, disposed in such a manner with respect to one another that the points do not overlap one another.

More precisely, the present invention relates to a device for forming latent magnetic images on the recording element of a magnetographic printer, in which the recording element is driven for displacement along a predetermined direction and is provided with magnetic recording tracks oriented practically parallel to this direction; the device is characterized in that, with the tracks are spaced apart from one another by a constant pitch, it includes:

at least two magnetic recording heads, each having a recording pole the width of which differs from one head to another, the width of the largest pole being greater than the spacing pitch of the tracks, and the width of the narrowest pole being such that the sum of the widths of the widest pole and the narrowest pole is less than twice said spacing pitch, a driving device arranged to put these heads successively facing each of said tracks and to permit these heads, when they are selectively excited, to form magnetized points of different sizes centered on these tracks, and a control unit for activating the heads, arranged to excite these heads selectively in such a manner that the magnetized points formed on the recording element do not overlap.

The invention will be better understood and further objects and advantages thereof will become more apparent from the ensuing description of an exemplary embodiment, which is understood not to be limiting, taken in conjunction with the accompanying drawings.

BRIEF DESCRIPTION OF THE DRAWINGS

FIG. 2 is a view showing the structure of the recording device belonging to the device for forming latent images with which the machine shown in FIG. 1 is equipped;

FIG. 3 shows the manner in which FIGS. 3A-3D are assembled;

FIGS. 4A-4D, when taken together, show another portion of the detailed logic scheme of the control circuits constituting the latent image formation device;

FIG. 4 shows the manner in which FIGS. 4A-4D are assembled;

FIG. 5 shows the structure of the excitation control device used in the scheme shown in FIGS. 3A-3D;

DESCRIPTION OF THE PREFERRED EMBODIMENTS

Figure 1:
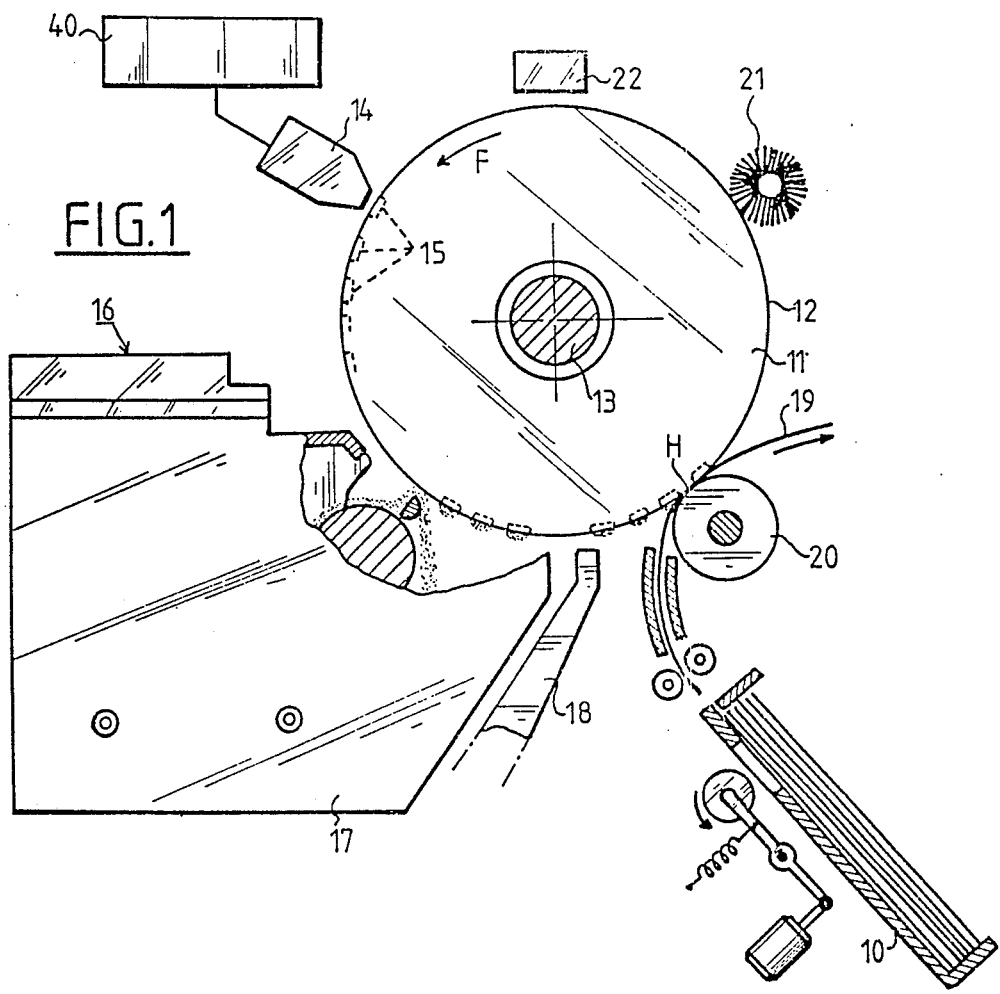
FIG. 1 shows a magnetographic printing machine equipped with a device for forming latent images made in accordance with the invention.

The printing machine schematically shown in FIG. 1 is a machine that performs the printing of sheets of paper that are drawn successively and continuously from a supply magazine 10.

This machine includes a recording element, which in the example described is constituted by a drum 11 provided with a magnetic recording surface 12.

This drum 11, which is mounted in such a way that it can rotate about a horizontal shaft 13, is driven in rotation in the direction indicated by the arrow F, by an electric motor (not shown). The recording of the information on the drum is effected by a recording device 14, the structure of which will be described somewhat later herein; this device 14 is controlled by an activation control unit 40, which will also be described later herein. For now, it is assumed that the device 14 includes a plurality of magnetic recording heads. Each of these heads, whenever it is excited for a brief moment by an electrical current, generates a variable magnetic field, the effect of which is to create virtually point-shaped magnetized zones 15 on the cylindrical surface 12 of the drum traveling past the heads; the set of these zones comprises a latent magnetic image corresponding to an image to be printed. These magnetized zones then travel past an applicator device 16 of a known type, which is disposed below the drum 11 and makes it possible to apply particles of a powder developer, contained in a reservoir 17, to the cylindrical surface to the drum. The developer particles that are thus applied by this device to the drum adhere in principle only to the magnetized zones of the drum, and then form an image in powder on the surface 12 of the drum. A retouching device 18, past which the image then travels, makes it possible to eliminate the developer particles that have adhered elsewhere than to the magnetized zones of the drum, as well as particles that are present in an excess amount on these zones. It should be noted here that the developer thus deposited onto the surface 12 of the drum comprises fine particles of thermoplastic resin containing magnetic particles and pigments; this resin is capable of melting when it is exposed to a source of heat and thus of becoming affixed to a sheet of paper to which the developer has been transferred. After that, the developer particles remaining on the drum 11 after having traveled past this retouching device 18 are normally transferred in virtual totality to a sheet of paper 19, which after having been removed from the magazine 10 is pressed by a transfer roller 20 against the surface of the drum 11. The region H where this roller 20 comes into contact with the surface of the drum whenever a sheet is not engaged between the roller and the drum comprises the transfer station. Accordingly it is in this station that the transfer of the image in powder that has been formed on the surface of the drum onto a sheet of paper located in engagement between the drum 11 and the roller 20 takes place. The developer particles which still remain on the surface of the drum, once this transfer has taken place, are then lifted by means of a cleaning device 21. The magnetized zones that have traveled past the cleaning device 21 then pass in front of an erasing device 22, which makes it possible for the portions of the drum 11 that have thus been demagnetized by this last device to be capable of remagnetization when they return to face the recording device 14.

The structure of the recording device with which the machine shown in FIG. 1 is equipped is illustrated in FIG. 2. Turning now to FIG. 2, it can be seen that the shaft 13 about which the drum 11 rotates is supported at its ends by two vertical support plates 30 and 31 that are joined together by means of a transverse connection plate 32. The plates 30 and 31 also support a guide bar 33 disposed parallel to the shaft 13 of the drum 11. A carriage 34, mounted to slide on the bar 33, may be driven for displacement in increments in a direction T parallel to the shaft 13 of the drum by means of a threaded rod 35 integrally joined with the drive shaft of an electric motor 36, which in turn is affixed to the vertical plate 30. Magnetic recording heads Y1, X1, Y2, X2, ..., Yn+1, are mounted on the carriage 34, and will be described in greater detail hereinafter. When the motor 36 is excited these heads, integrally joined to the carriage 34, are then driven for displacement in the direction T which is parallel to the shaft 13 of the drum.

These heads are placed on the carriage 34 in such a way that they are located in the immediate proximity of the surface 12 of the drum 11, or such that they come into immediate proximity with this surface in the course of the displacement of the carriage. The carriage 34 and the heads that it carries may be displaced between limit positions, of which one, LG, is shown solid lines in FIG. 2 and the other, LD, is shown in broken lines, also in FIG. 2. The portion of the surface of the drum 11 that travels past each of these heads when the carriage 34 is immobile is typically known as a track. These tracks, which are relatively narrow, are centered on lines that hereinafter will be called track centering lines. In FIG. 2, these lines, which are circular and are spaced apart from one another by a constant pitch p, have been shown in broken lines and are identified by reference numerals D1, D2, D3, ..., D12n. For the sake of clarity in the drawing, these centering lines have been represented in FIG. 2 in positions spaced relatively far apart from one another. However, it should be noted that in reality both these lines and thus the tracks centered on them are quite close to one another; in the example described, the spacing p of the tracks, that is, the distance p separating two adjacent centering lines, is substantially equal to 53 μm. Moreover, it can be seen in FIG. 2 that the number of heads affixed to the carriage 34 is less than the number of centering lines of the drum 11, and when the carriage is immobilized in its limit position LG (on the left in FIG. 2), each of the heads X1, Y2, X2, ..., Yn+1 is located exactly facing one of these centering lines. Accordingly, in the example described, when the carriage 34 is placed in its position LG, the head X1 is located facing the line D1, the head Y2 is located facing the line D7, the head X2 is located facing the line D13, and the head Yn+1 is located facing the line D12n−5.

Figure 7:
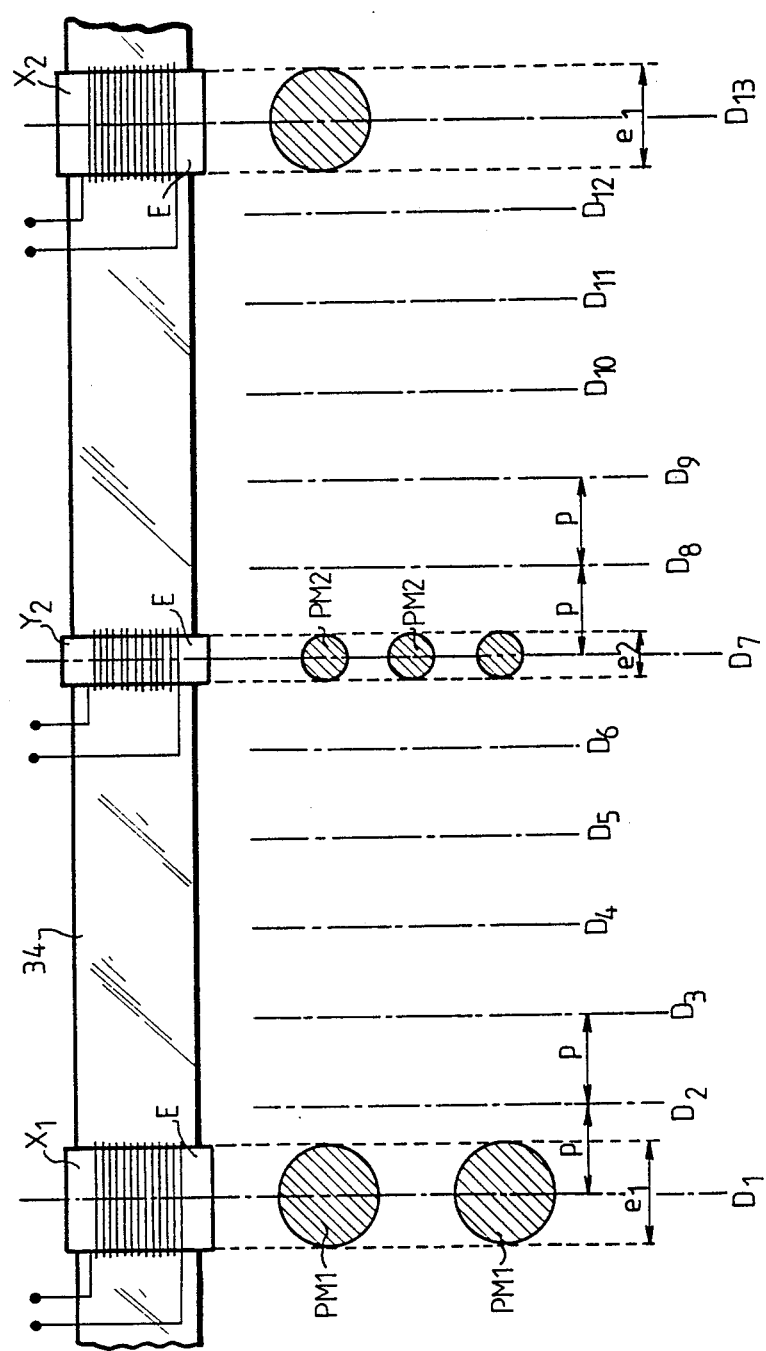
FIG. 7 is a detail showing the size and respective disposition of the recording heads with which the recording device shown in FIG. 2 is equipped.

As can be seen in FIG. 2, and even better in the detailed view of FIG. 7, the recording heads that are affixed to the carriage 34 are not all identical, but instead differ in size from one another. More precisely, as FIGS. 2 and 7 show, the recording heads mounted on the carriage 34 are divided into two series of heads, that is, a first series comprising n heads of the same size X1, X2, ..., Xn, and a second series including n+1 heads of the same size Y1, Y2, ..., Yn+1, the size of the heads of the second series differing from that of the heads of the first series. FIG. 7 shows that each of these heads comprises a head of soft magnetic material, provided with an excitation winding and having a recording pole E at one of its ends. It should be noted here that as can be seen in FIG. 7, the width el of the recording pole of the heads of the first series X1, X2, ..., Xn is greater than the spacing pitch p of the tracks, but less than twice the value of this pitch, while the width e2 of the recording pole of the heads of the second series Y1, Y2, ..., Yn+1 is such that the sum e1+e2 is less than twice the spacing pitch p of the tracks.

Thus in the example described, the width el of the recording pole of each of the heads X1, X2, ..., Xn=66 μm, and the width e2 of the recording pole of each of the heads Y1, Y2, ... Yn+1=35 μm. Under these conditions, when the heads are excited selectively during a very brief instant by an electrical current, the excited heads of the first series X1−Xn form magnetized points PM1 of relatively large size on the magnetic surface of the drum 11; that is, these are points the dimension of which is greater than the spacing pitch p of the tracks, while the excited heads of the second series Y−Yn+1 form magnetized points PM2 of relatively small size on this surface; that is, these are points the dimension of which is less than this spacing pitch.

In a very advantageous embodiment of the invention, shown in FIG. 2, the number of tracks on the drum 11 is a multiple of twice the number n of heads of the first series. In other words, this number of tracks equals 2 fn, where f is an integer.

Furthermore, the recording heads of the two series X1−Xn and Y1−Yn+1 are distributed regularly along the carriage 34 at a spacing pitch equal to fp, the heads of the second series Y1−Yn+1 being disposed in alternation with those of the first series X1−Xn, and each of the heads of this first series are located between two heads of the second series. In the example described, f is selected equal to 6. Since when the carriage 34 is immobilized in its limit position LG, the head X1 is located facing the line D1, it can be seen that for this position of the carriage, the head X2 is facing the line D13, the head X3 is facing the line D25, ..., the head Xn is facing the line D12n−11; and similarly, the head Y2 is facing the line D7, the head Y3 is facing the line D19, ..., and the head Yn+1 is facing the line D12n−5. It will be seen that for this position of the carriage 34, the first head of the second series, that is, the head Y1, is not located in front of the surface of the drum. When the carriage 34 is immobilized in its limit position LG, it is then possible in the course of one complete rotation of the drum to record information in the tracks centered on the lines D1, D7 D13, ..., D12n−5, which are located facing the heads X1−Xn and Y2−Yn+1. Once this recording is completed, the carriage 34 can be displaced by one increment, equal to the spacing pitch p, to the right by temporarily exciting the motor 36, to locate the heads X1, X2, X3, ..., Xn, Y2, Y3, ..., Yn+1 facing the lines D2, D14, D26, ..., D12n−10, D8, D20, ..., D12n−4, respectively, and thus to permit the recording of other information in the tracks centered on these new lines in the course of another complete rotation of the drum 11. It will be understood that under these conditions the recording of a latent magnetic image formed of magnetized points distributed on the various lines D1−D12n of the drum takes place in the course of a plurality of rotations of this drum. In the case where only the heads of the second series Y1−Yn+1 are excited selectively, the recording requires 12 complete rotations of the drum 11 in order to be effected. Since the magnetized points PM2 that are formed by these heads have a dimension less than the spacing pitch p of the tracks, these magnetized points cannot overlap one another.

Now in order to obtain a magnetic latent image on the drum, if only the heads of the first series X1−Xn are excited selectively, the magnetized points PM1 formed by these heads are at great risk of overlapping one another, since their dimension is greater than the spacing pitch p of the tracks. Accordingly, to prevent this overlapping, when the heads X1−Xn are used alone, they are excited selectively only when they are located facing the centering lines D1, D3, D5, D7, and so forth, that is, the odd-numbered lines. Finally, in the case where the heads X1−Xn are used at the same time as the heads Y1−Yn+1, the excitation of all of these heads is controlled such that the magnetized points of large size and small size which are thus formed do not interfere with one another. As a consequence, the recording device shown in FIG. 2 can be used in various different modes of operation, that is:

a first mode, in which only the heads X1—Xn are excited selectively, and in which the formation of the latent magnetic image is effected in the course of six rotations of the drum 11, a second mode, in which only the heads Y1—Yn+1 are excited selectively, and in which the formation of the latent magnetic image is effected in the course of 12 rotations of the drum 11, and a third mode, in which all the heads are selectively excited, but with the restriction noted below concerning the excitation of the heads X1—Xn and Y1—31 Yn+1, and in which the formation of the latent magnetic image is effected in the course of 12 rotations of the drum 11.

Other modes of operation are also possible; however, they are of less value and hence are not described here.

Figure 3A:
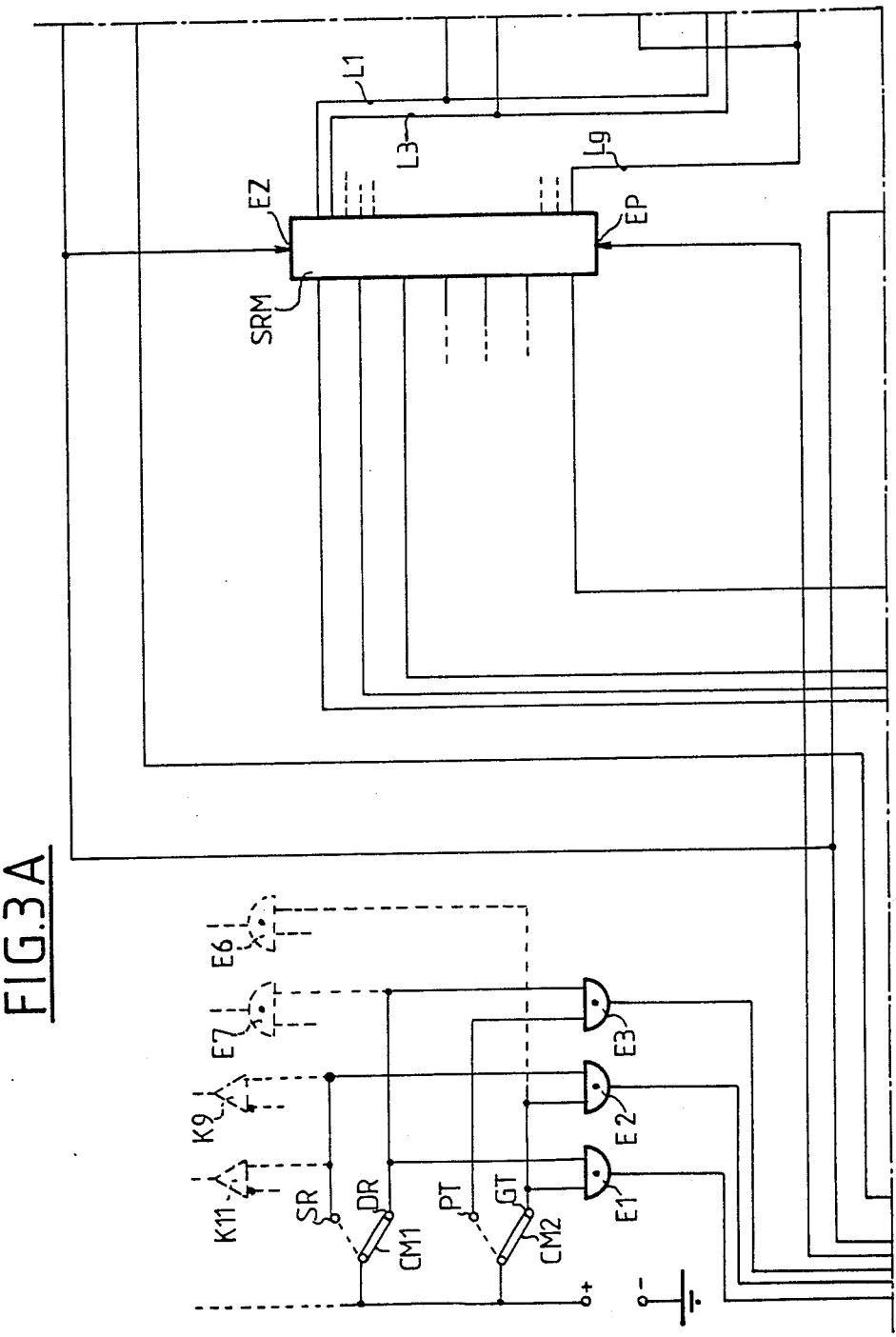
FIGS. 3A-3D, taken together, show a portion of the detailed logic scheme of the control circuits constituting the latent image formation device.
Figure 3B:
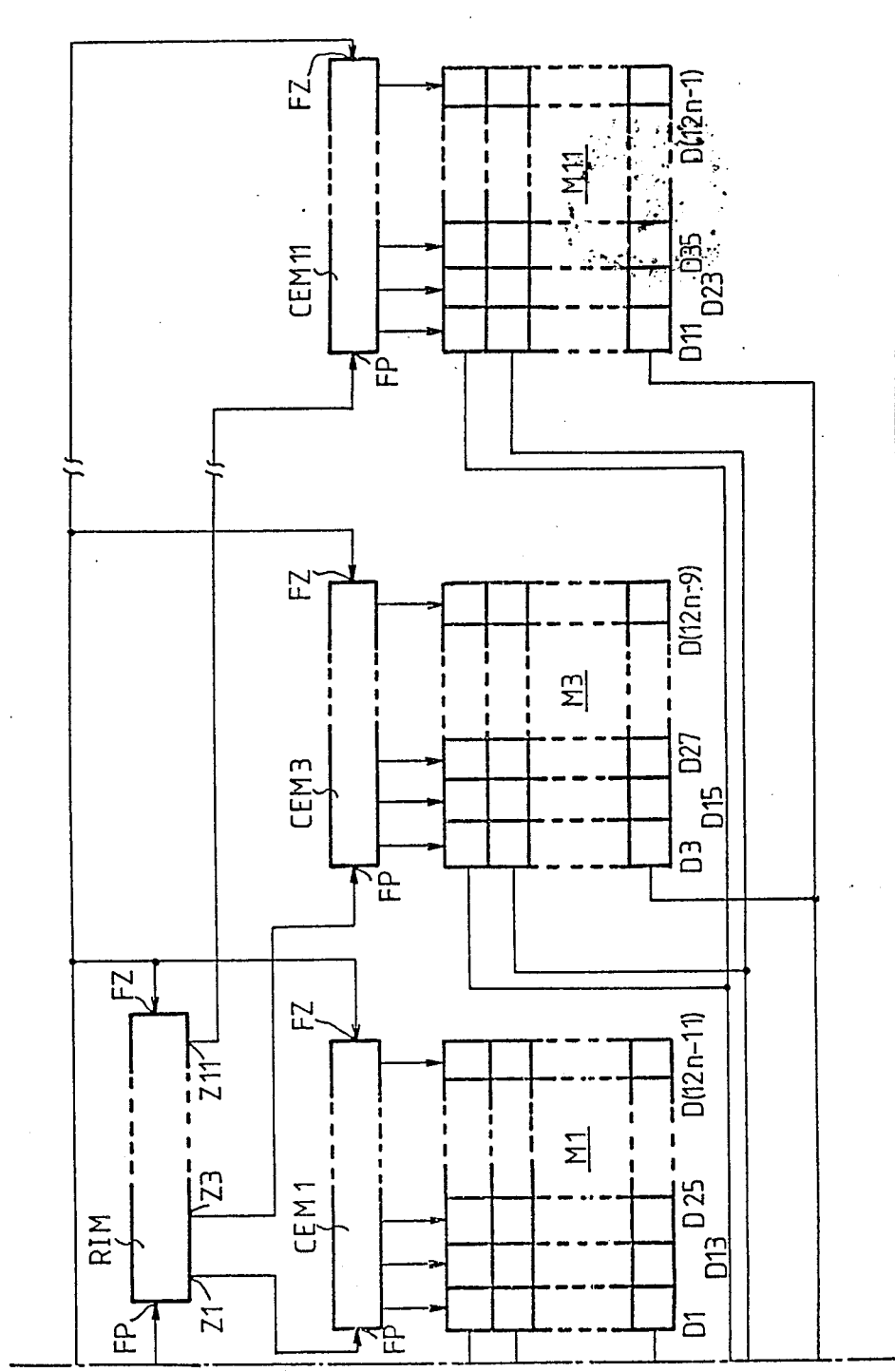
Figure 3C:
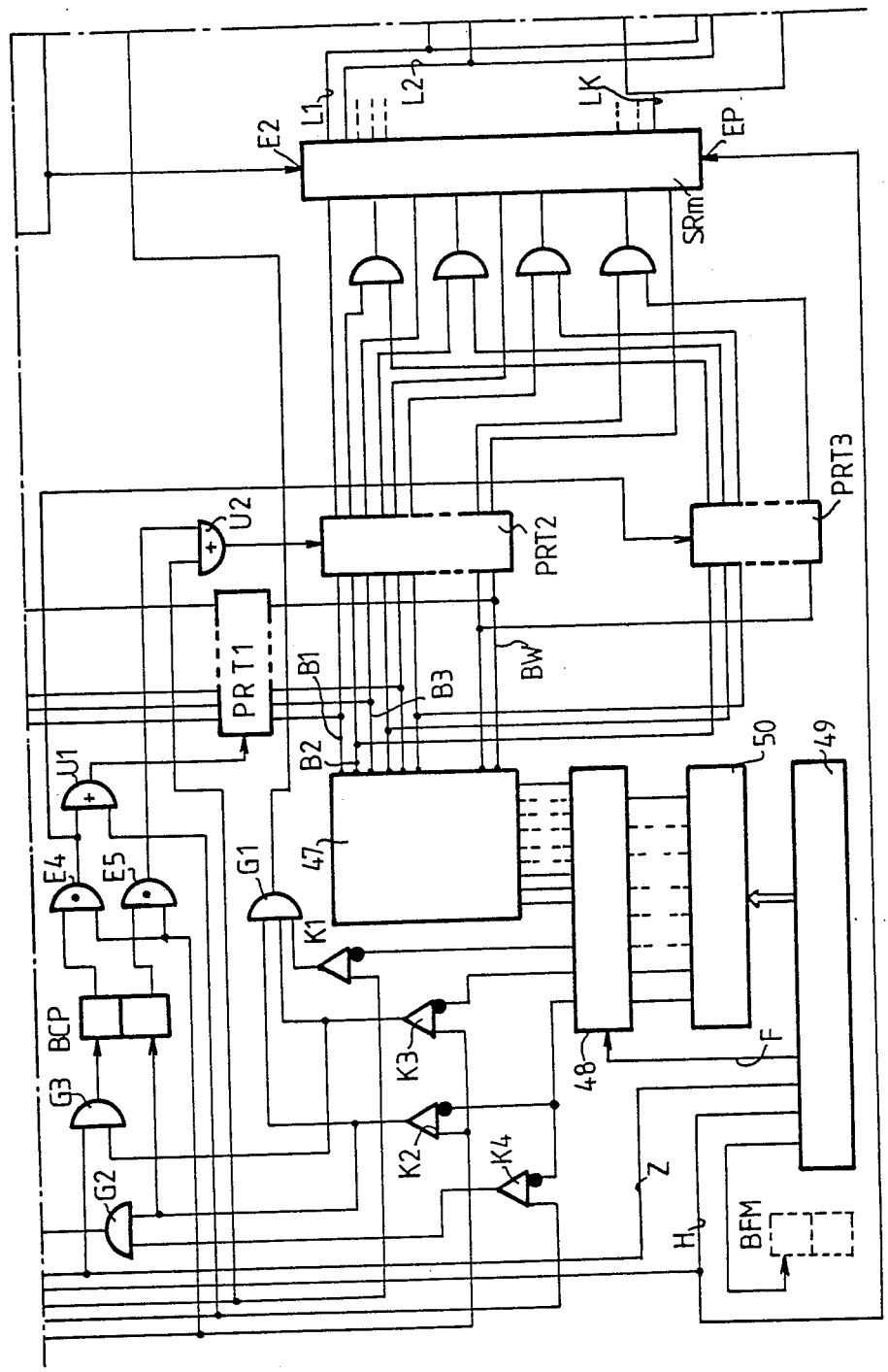
Figure 3D:
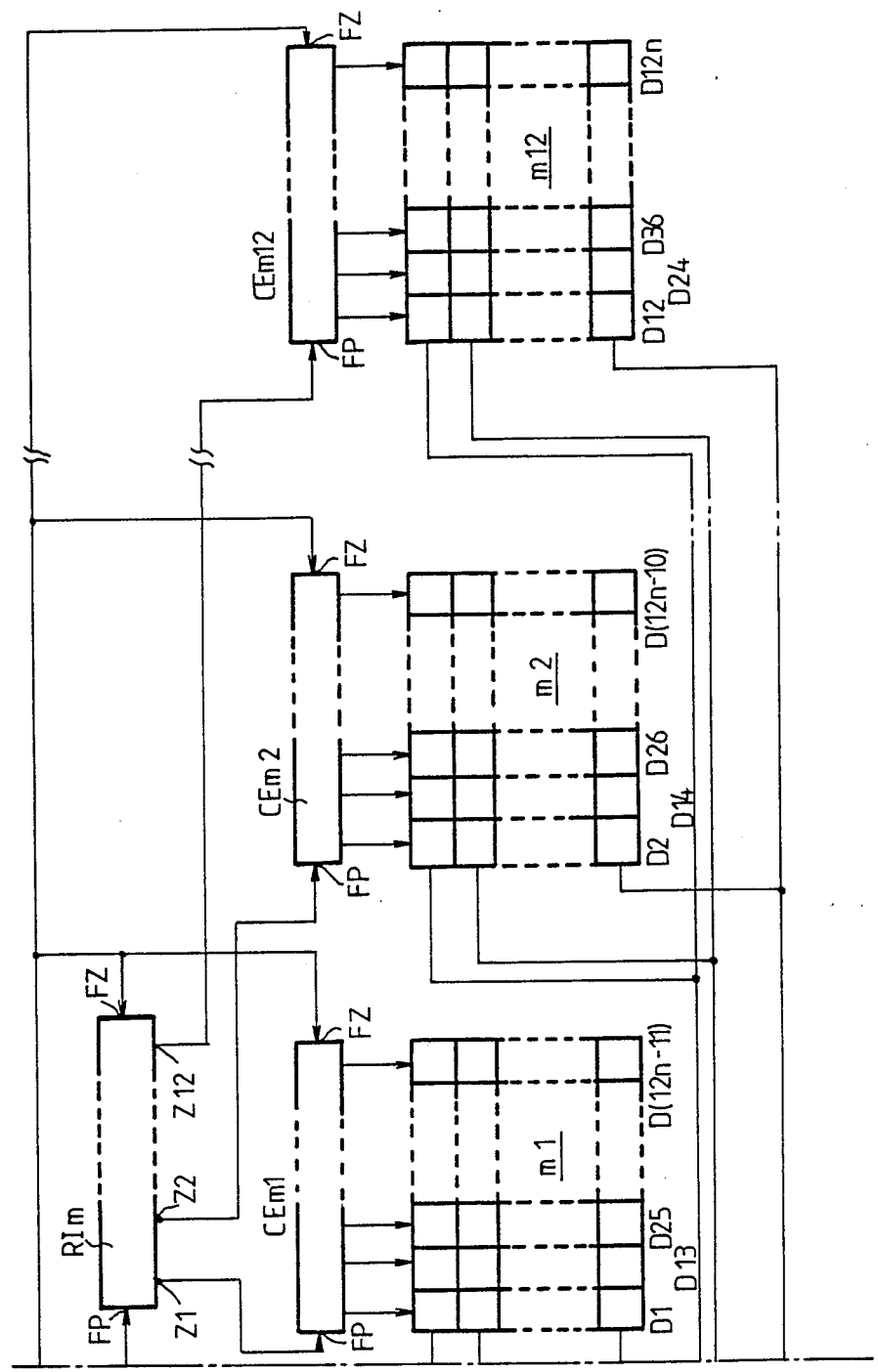
Figure 4A:
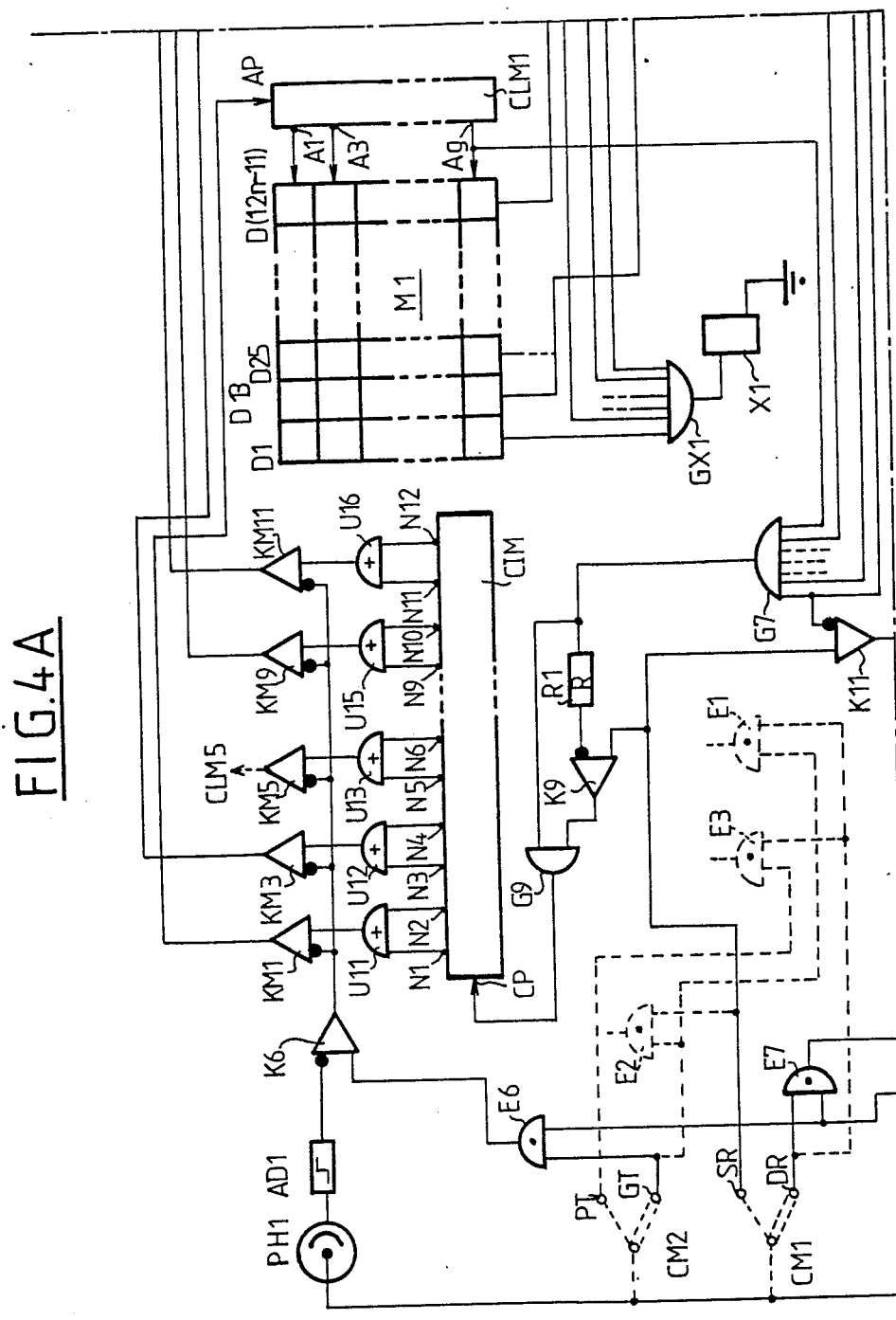
Figure 4C:
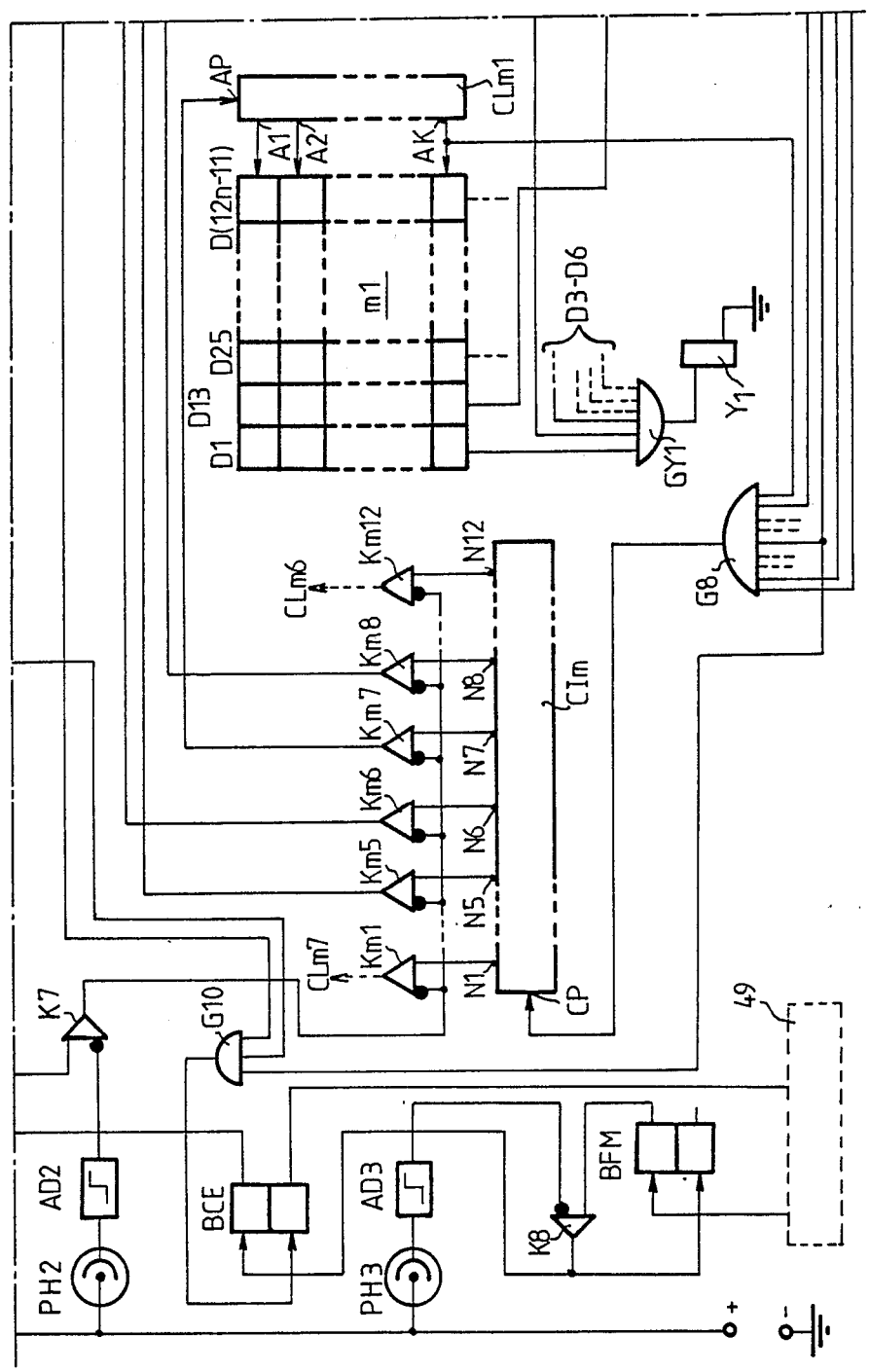
Figure 4D:
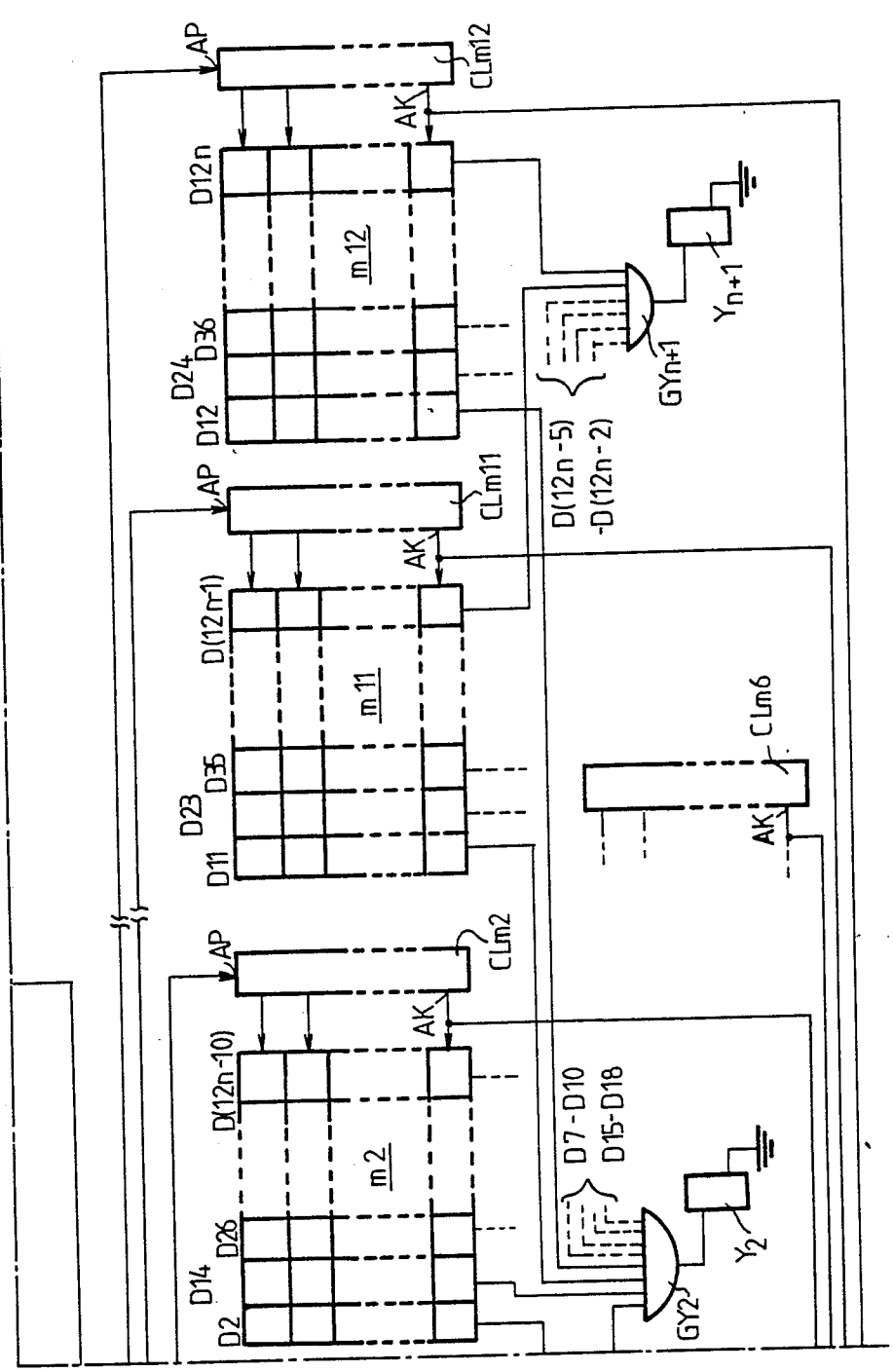

In order to permit the machine shown in FIGS. 1 and 2 to function by one of these modes, the machine is equipped with a control unit 40 for activating the heads; this unit has been shown in FIG. 1, and its structure is shown in detail in FIGS. 3A–3D, assembled as indicated in FIG. 3, and in FIGS. 4A–4D, assembled as indicated by FIG. 4. Before this structure is described, it should be noted that this unit 40 includes three photoelectric cells PH1, PH2 and PH3 (FIGS. 2, 4A and 4B), which as FIG. 2 shows are affixed to the support plate 31 in such a manner that each receives a beam of light emitted by the corresponding one of three light sources S1, S2 and S3. A clock disk D, affixed to the shaft 13 of the drum 11, is provided with a window, which allows the beam of light transmitted by the source S3 to the cell PH3 to pass through it for a brief moment. Each time this window allows this beam to pass through it, or in other words each time the drum 11 has completed one rotation, the cell PH3 emits a positive electrical voltage at its output for a brief moment; this voltage is applied to the input of a differential amplifier AD3 (FIG. 4C). This differential amplifier AD3 is designed to furnish a single electrical pulse at its output each time its input is connected to a positive potential, or in other words each time the drum 11 has completed one rotation. The clock disk D is also provided with two series of windows that at certain moments allow the beams of light transmitted by the sources S1 and S2 to the cells PH1 and PH2 to pass through them. The windows of these two series are distributed in such a way that on the one hand, the cell PH2 furnishes a positive electrical voltage at its output for a brief moment, each time the cylindrical surface of the drum 11 is displaced in the course of its rotation by a distance equal to the spacing pitch p of the centering lines, and on the other hand, the cell PH1 furnishes a positive electrical voltage at its output for a short moment each time this cylindrical surface is displaced by a distance equal to twice this pitch p.

The electrical voltages thus generated by the cells PH1 and PH2 are applied respectively to each of the inputs of two differential amplifiers AD1 and AD2, which since the are the same type as the differential amplifier AD3 each furnish an electrical pulse at their respective output each time their input is carried to a positive potential.

Turning to FIGS. 3A–3D and 4A–4D, the detailed structure of the activation control unit 40 will no be described; this structure is shown in these drawing figures in the form of a logic diagram. On this diagram, the semicircles having a + sign represent OR logical circuits, while the half circles with a dot represent AND logical circuits; the half circles without any sign or point represent "mixer" logical circuits, and the triangles represent control circuits. These circuits of a known type are similar to those described and shown particularly in French Patent Nos. 1.342.787 and 1.387.085, filed by the Compagnie des Machines Bull on July 24, 1962 and Oct. 28, 1963, respectively. It will be recalled simply that each control circuit includes two inputs, one of which, marked by a dot in the drawings, is a conditioned input, to which the pulses to be transmitted are applied, and the other is a conditioning input, to which an electrical voltage is applied. It will also be recalled that each control circuit transmits a pulse applied to its conditioned circuit only if its conditioning input is at a positive potential.

In FIGS. 3A–3D and 4A–4D, bistable elements, commonly known as flip-flops or multivibrators, have also been shown. It will be recalled that each multivibrator, such as the multivibrator BCP which is shown in FIG. 3C, includes one "standard" input, one "complementary" input, one "standard" output and one "complementary" output, and that it changes to or remains in the "1" state each time it receives a pulse via its "standard" input and changes to or remains in the "0" state each time it receives a pulse via its "complementary" input.

Turning to FIGS. 3A–3D, it is seen that the activation control unit 40 includes a first series of memorizing blocks including f (that is, 6 in this case) memorizing blocks M1, M3, M5, M7, M9 and M11, only three of which, M1, M3 and M11, have been shown in FIG. 3B, and a second series of memorizing blocks including 2f (12 in this case) memorizing blocks identified by reference symbols m1–m12, only three of which, m1, m2 and m12, have been shown in FIG. 3D.

Before providing detailed descriptions of the structure of these memorizing blocks, it will be noted that each of these blocks includes a plurality of storage positions, represented by squares in FIGS. 3B and 3D, which are disposed along k horizontal rows and n vertical columns for the blocks m1–m12, or along k/2 horizontal rows and n vertical columns for the blocks M1, M3, M5, M7, M9 and M11; each storage position is arranged to temporarily contain one data bit required for controlling the recording of one magnetized point on the drum 11. These data bits originate in a data bit generator 47 (FIG. 3C), which furnishes them in response to control signals transmitted by an excitation control device 48, which will be described later herein. For now, it is noted simply that these control signals are transmitted by this device 48 in reponse to the reception of a control pulse transmitted via a conductor F by a main control unit 49 and as a function of the decoding performed by a decoder register 50, this register 50 having previously received a binary encoded combination, representing one character to be printed, from the control unit 49.

The memorizing blocks M1, M3, M5, M7, M9, M11 and m1–m12 which are shown in FIGS. 3A–3D are of a known structure. It will be assumed that this structure is similar to that of the memorizing device which is additionally described and shown in French Patent No. 2.443.335, filed on Dec. 6, 1978 by the Compagnie Internationale pour l'Informatique CII HONEYWELL BULL. Details of the constitution and function of this structure may be found in this patent.

Figure 6:
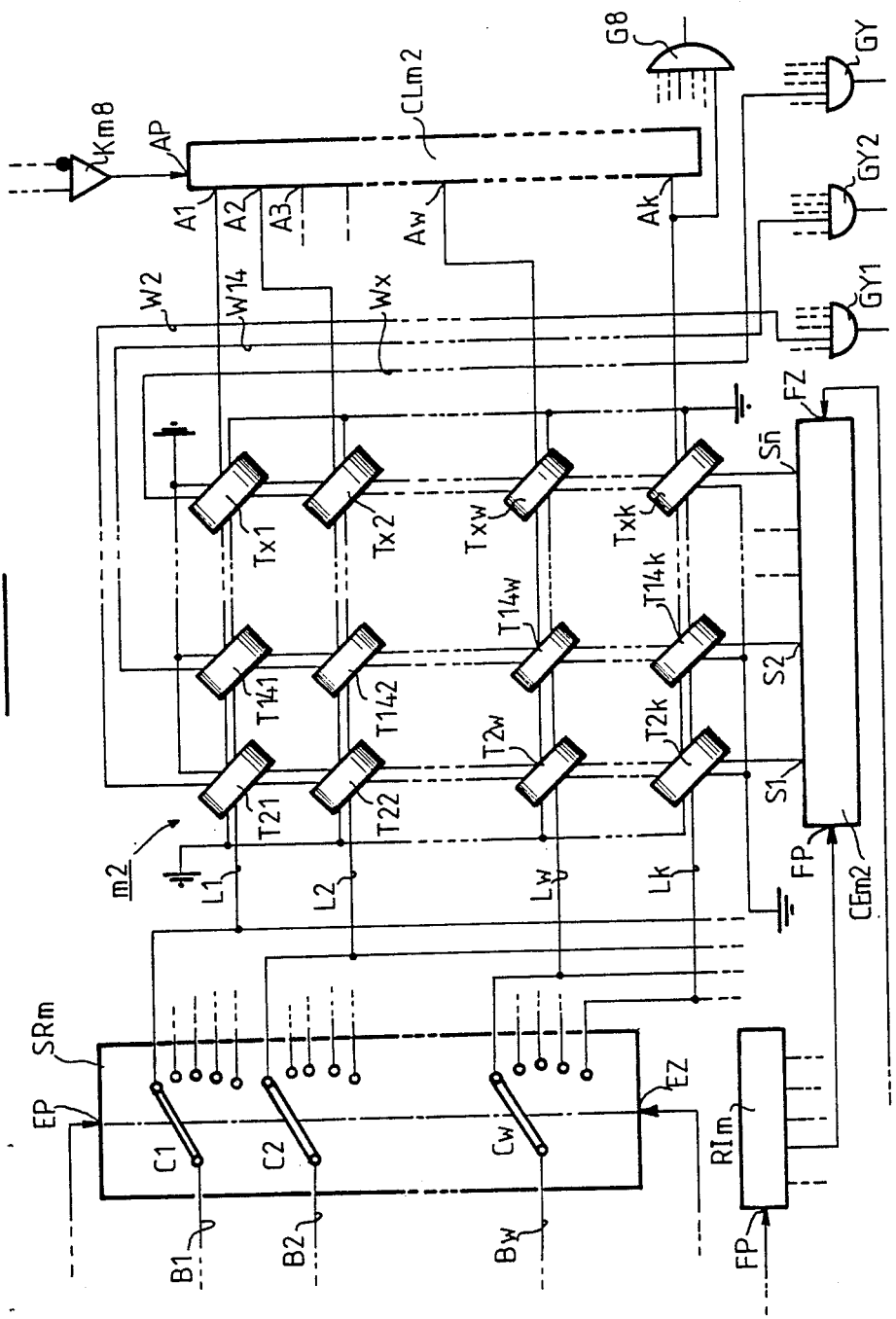
FIG. 6 shows the constitution of one of the memorizing blocks that are used in the diagram of FIGS. 3A-3D and 4A-4D.

It should be noted, however, that as can be seen in FIG. 6, on which the memorizing block m2 is schematically shown, this block includes kn magnetic cores disposed along k horizontal rows, each including n magnetic cores; the first row includes the cores T21, T141, . . . , Tx1, the second row includes the cores T22, T142, . . . , Tx2, and so forth, and the last row includes the cores T2k, T14k, . . . , Txk. Each of these k rows of cores is traversed respectively by one of k conductors L1, L2, . . . , Lk. All of these cores are disposed along n vertical columns as well, where the first column includes the cores T21, T22, . . . , T2k, the second column includes the cores T141, T142, . . . , T14k, and so forth.

Each column of cores is traversed on the one hand by one of n conductors, each connected respectively to each of the n outputs S1, S2, . . . , Sn, of a scanning string CEm2, and on the other hand by one of n conductors W2, W14, . . . , Wx, which as will be seen below are intended for transmitting the pulses required for the excitation of the recording heads. In the example described, these heads are used to form magnetic images on the surface of the drum of characters each formed by a set of points located inside a matrix including w horizontal rows and z vertical lines, with $w \leq k$ and $z \leq n$. In the example described, it will be assumed that the values of w and z have been selected to be equal to 48 and 35, respectively. As a consequence, to permit control of the formation of the constituent points of one character, the bit generator 47 is provided with w (in this case, 48) outputs, and as will be seen below it is arranged to furnish z (that is, 35 in this case) groups of bits successively, under the control of the encoded combination contained in the decoder register 50 and representing this character; each of these groups of bits include w data bits.

Each of the groups of w bits is then transmitted by the generator 47 over the conductors B1, B2, . . . , Bw, which as FIG. 3C shows are connected to the w outputs of this generator; these w bits are intended for being recorded in one of the memorizing blocks, in a manner to be described below. To permit the w bits of the same group to be recorded in w magnetic cores located in the same vertical line of a particular block, for example in the cores T21, T22, . . . , T2w of the block m2, the conductors L1-Lk of this block are connected selectively, by groups of w conductors, as shown in FIG. 6, to the conductors B1, B2, . . . , Bw, via a row selector SRm. This selector includes w switches C1, C2, . . . , Cw, with a plurality of positions, which can be actuated simultaneously in such a manner as to be placed at identical positions; these switches each include an input terminal connected to the corresponding one of the conductors B1, B2, . . . , Bw and a number N of output terminals such that Nw=k; these output terminals are connected to the conductors L1, L2, . . . , Lk, such that when the switches are placed in their first position, the conductors B1, B2, . . . , Bw are each connected respectively to each of the conductors L1, L2, . . . , Lw, while when these switches are placed in their second position, the conductors B1, B2, . . . , Bw are each connected respectively to each of the w conductors which are located following the conductors L1, L2, . . . , Lw, and so forth. The selector SRm further includes two inputs EP and EZ, and it is arranged such that when an electrical pulse is applied to its input EZ, the switches C1, C2, . . . , Cw are put in their first position, which is the position shown in FIG. 6, while each time an electrical pulse is applied to the input EP, the switches are displaced simultaneously so as to be located in the next position.

In the memorizing block shown in FIG. 6, the selection of a column of cores, with a view to recording the data bits originating in the generator 47 and transmitted via the conductors B1, B2, . . . , Bw in w cores of this column, is effected by the scanning string CEm2. This string, of known structure, includes two inputs FP and FZ, and it is arranged to furnish an electrical pulse over only one of its outputs S1, S2, . . . , Sn each time that it receives an electrical signal via its input fp originating in the excitation control device 48 and transmitted, as shown in FIGS. 3C and 3D, by any one of the three control circuits K1, K2 and K3; the pulse transmitted by one of these circuits is transmitted to this input FP via a mixer circuit G1 and a pulse distributor RIm, which will be described later herein.

In response to the pulse thus applied to its input FP, the string CEm2 furnishes a pulse over only one of its inputs S1, Sn, and then progresses by one increment, with the result that when this string then receives another pulse via its input FP, it furnishes a pulse to its following output, then progresses by a further increment, and so forth. The string CEm2 is also arranged such that when it receives a pulse via its input FZ and then receives a pulse via its input FP, it furnishes an impulse over its output S1 and then advances by one increment.

FIG. 6 also shows that each of the k horizontal rows of magnetic cores of the memorizing block m2 is transversed respectively not only by one of the k conductors L1-Lk, but also by one of the k conductors connected to the outputs A1, A2, . . . , Ak of another scanning string CLm2. This other string CLm2, the structure of which is similar to that of the string CEm2, includes an input AP connected to the output of a control circuit Km8, and it is arranged that such that when it receives a first pulse transmitted by this circuit Km8, it furnishes a pulse at its first output A1, which causes the extraction of the data bits which have been recorded in the first row of cores of the block m2, that is, the cores T21, T141, . . . , Tx1. This extraction takes place in the form of pulses that are transmitted to the heads Y1-Yn, via the conductors W2, W14, . . . , Wx.

When this string CLm2 then receives a second impulse at its input AP, transmitted by the circuit Km8, it furnishes a pulse at its second output A2, the effect of which to cause the extraction of the data bits that have been recorded in the second row of cores of the block m2. It will be understood that under these conditions the extraction of all the data bits contained in the block m2 comes to an end when, in response to the reception of a kth pulse applied to its input AP, the string CLm2 has furnished a kth pulse at its last output Ak.

Details of the structure of the other memorizing blocks m1 and m3-m12 or of the scanning strings associated with these blocks will not be given here, because these structures are similar to those of the block m2 and the strings CEm2 and CLm2 that have just been described above. Nor will details of the structure of the blocks M1, M3, M5, M7, M9 and M11 or of the scanning strings, such as CEM1 (FIG. 3B) and CLM1 (FIG. 4A), associated with these blocks, be given because these structures are similar to those of the block m2 and the strings CEm2 and CLm2, except that the number g of horizontal rows of magnetic cores of each of these six blocks equals one-half the number k of horizontal rows of cores of the block m2.

It should also be pointed out that as will be seen below, the memorizing blocks M1, M3, M5, M7, M9 and M11 are not intended for recording the w data bits of each of the groups of bits that are transmitted by the bit generator 47 but rather for recording only one half of the bits of each of these groups, that is, w/2 data bits per group, or every other bit. To permit the recording of the w/2 bits of one group to be recorded in w/2 cores located in the same column of one of these six blocks, the conductors L1, L3, L5, ... , Lg of each of these blocks are connected selectively, as can be understood from FIGS. 3A, 3B and 3C, via groups of w/2 conductors, to the conductors B1, B3, B5, ... (that is, to the odd-numbered conductors B), via a row selector SRM.

The selection of a column with a view to recording these w/2 bits in w/2 cores of this column is effected by the one of the six scanning strings CEM1, CEM3, CEM5, CEM7, CEM9 and CEM11 that is associated with the memorizing block involved in this recording. Each of these six strings furnishes a pulse at only one of its n outputs in response to a pulse originating in the excitation control device 48 and transmitted successively, as FIGS. 3A, 3B and 3C show, via either a control circuit K2 or a control circuit K4 and then via a mixer circuit G2 and finally via pulse distributor RIM. The pulse distributor RIM has a structure similar to that of the scanning strings CEM1, CEM3, CEM5, CEM7, CEM9 and CEM11 and CEml-CEm12. This distributor RIM includes an input FP to which the pulses are applied that have been transmitted via the control circuit K2 or the control circuit K4, and six outputs Z1, Z3, Z5, Z7, Z9 and Z11, which are each connected respectively to the input FP of each of the scanning strings CEM1, CEM3, CEM5, CEM7, CEM9 and CEM11. This distributor RIM also includes an input FZ, and like all the scanning strings is arranged such that when it receives a pulse via this input FZ and then receives a pulse via its input FP, it furnishes a pulse at its output Z1 and then advances by one increment. Next, in reponse to a second pulse applied to its input FP, it furnishes a pulse at its output Z2 and advances by another increment, and so forth.

The pulse distributor RIm which was mentioned earlier above has a structure similar to that of the distributor RIM, with the difference that it includes 12 outputs Z1-Z2, Z3, ... , Z12, which are each connected respectively to the input FP of each of the scanning strings CEml-CEm12.

Thus as can be seen in FIGS. 3A—3D and 4A—4D, the columns of cores of the various memorizing blocks are indicated by the letter D, followed by a numeral corresponding to the order in which the various centering lines of the drum follow one another. Taking into account the mode of distribution of the recording heads, these columns D1, D2, D3, and so forth are not contiguous with one another but rather are distributed among the blocks in such a way that for the same block, the designation of one column plus 12 becomes the designation of the following column. Thus blocks M1 and ml include columns D1, D13, D25, ... , D12n−11; block m2 includes columns D2, D14, D26, ... , D12n−10, and so forth; and block m12, finally, includes columns D12, D24, D36, ... D12n.

It can then be seen in FIGS. 3A-3D that the transmission of the bits that are furnished by the bit generator 47 is controlled by three gates PRT1, PRT2 and PRT3. The gate PRT1 either does or does not authorize the transmission of bits transmitted to the selector SRM over the conductors B1, B3, B5, and so forth; the gate PRT3 either does does not authorize the transmission of bits transmitted to the selector SRm over the conductors B2, B4, B6, and so forth; and the gate PRT2 either does does not authorize the transmission of bits transmitted to the selector SRm over the conductors B1, B2, B3, B4, and so forth.

The manner in which the data bits, furnished by the bit generator 47 in response to the decodifying of the encoded combinations representing characters to be printed, are recorded in the memorizing block of the activation control unit 40 will now be described, taking into account the mode of operation, selected by the operator, of the recording device. It should be noted that this mode of operation selected by the operator is determined by the position occupied by two manual contacts CM1 and CM2 (FIGS. 3A and 4A); the operator effects the positioning of these two contacts prior to commanding the triggering of the function of the main control unit 49.

Thus as seen in FIG. 4A, the contact CM1 includes an input terminal connected to the positive terminal (+) of a source of direct current, and a movable blade that can be placed on one or the other of two output terminals SR and DR, depending on whether the operator seeks to record latent images onto the drum 11 in six rotations of the drum (output terminal SR) or in 12 rotations (output terminal DR) of the drum. The contact CM2 includes an input terminal which is connected to the positive terminal (+) of the current source, and a movable blade that can be placed on one or the other of two output terminals PT and GT, depending on whether the operator wishes the magnetized points that are used to make up these images to be of small size (PT) or large size (GT). FIG. 3A shows the three AND circuits E1, E2 and E3 are connected to the output terminals of these two contacts CM1 and CM2, such that when the movable blades of these contacts are placed on the terminals DR and GT, a positive voltage appears at the output of the circuit El and is applied on the one hand to the conditioning input of the two control circuits K2 and K3 (FIG. 3C), which then become conducting, and on the other hand to one of the inputs of two AND circuits E4 and E5, with each of these two AND circuits including two inputs. When the movable blades of the contacts CMI and CM2 are placed on the terminals SR and GT, a positive voltage appears at the output of the circuit E2 and is applied on the one hand, via an OR circuit U1, to the gate PRT1, and on the other hand to the conditioning input of the control circuit K4, which then becomes conducting. When the movable blades of the contacts CMI and CM2 are placed on the terminals DR and PT, a positive voltage appears at the output of the circuit E3 and is applied on the one hand, via an OR circuit U2, to the gate PRT2, and on the other hand to the conditioning input of the control circuit K1, which then becomes conducting.

It can also be seen from FIGS. 3A and 4A that the terminal SR is also connected to the conditioning input of each of two control circuits K9 and K11, which will be described later herein, and the terminal DR is additionally connected to one of the two inputs of an AND gate E7, and the terminal GT is additionally connected to one of the two inputs of an AND circuit E6.

First, the case will be considered in which, in order to permit the recording device to function by the third mode of operation mentioned above, the movable blade of the contact CM1 has been positioned on the terminal DR, and the movable blade of the contact CM2 has been placed on the terminal GT. In this case, as has been seen above, no positive voltage appears at the output of the circuits E2 and E3, and consequently the circuits K45 and K1, which are respectively connected to the outputs of these circuits E2 and E3, are non-conducting. Contrarily, a positive voltage appears at the output of the circuit E1 and is applied on the one hand to one of the inputs of the circuits E4 and E5 and on the other hand to the circuits K2 and K3, which then become conducting. Moreover, the positive voltage furnished by the terminal DR is applied to one of the inputs of the circuit E7, and the positive voltage furnished by the terminal GT is applied to one of the inputs of the circuit E6.

The recording operations are first preceded by the transmission, via the control unit 49, of a pulse over a conductor Z (FIG. 3C), this pulse thus being applied, as seen in FIGS. 3A-3D, both to the inputs EZ of the row selectors SRM and SRm and to the inputs FZ of the pulse distributors RIM and RIm, and to the inputs FZ of all the scanning strings. Under these conditions, in response to the first pulse that will later be applied to the input FP of the distributor RIM, this distributor will furnish a pulse at its output Z1 and apply it to the input FP of the string CEM1. In response to this pulse, the string CEM1 will furnish a pulse at its output S1, thus selecting the first column of cores of the block M1, that is, column D1. Moreover, as a consequence of the positioning of the row selector SRM, the w/2 first rows L1, L3, L5, and so forth of the block M1 are connected to the w/2 conductors B1, B3, B5, B7, and so forth, which as shown in FIG. 3C are monitored by the gate PRTI, such that if at the moment of transmission of data bits via the generator 47 this gate is conducting, the bits carried by the conductors B1, B3, B5, B7, etc., will be recorded in the w/2 cores, which are located in the block M1 at the intersection of column D11 and rows L1, L3, L5, and so forth. Analogously, as a consequence of the positioning of the distributor RIm, strings CEm-1-CEm12 and the selector SRm, the first column D1 of cores of the block m1 is selected, and if the gate PRT3 (FIG. 3C) assigned to monitor the pulses transmitted over the conductors B2, B4, B6, B8, and so forth is made conducting, the data bits carried by these conductors will be recorded in the w/2 cores located in the block ml at the intersection of column D1 and rows L2, L4, L6, and so forth. If this gate PRT3 is non-conducting, but the gate PRT2 that monitors the pulses transmitted over all the conductors B1-Bw is conducting, then the w data bits carried over these conductors B2-Bw will be recorded in the w cores that are located in the block ml at the intersection of column D1 and rows L1, L2, L3, . . . , Lw.

As can be seen in FIG. 3, the pulse that is transmitted via the control unit 49 over the conductor Z is thus also applied, via a mixer circuit G3, to the standard input of the multivibrator BCP. Under these conditions, the multivibrator BCP shifts to the state "1", and the positive voltage that appears at its standard output is applied to the other input of the circuit E4. It should also be noted that the pulse that is transmitted over the conductor Z is also applied (although not shown in the drawings for the sake of simplicity) to the complementary inputs of the other multivibrators that are shown in FIGS. 4A-4D, with the effect of shifting these other multivibrators to the "0" state, in the possible event that these multivibrators were not already in that state.

Because the two inputs of the circuit E4 are now carried to a positive potential, a positive voltage appears at the output of this circuit E4 and is applied both to the gate PRT3, which thus becomes conducting, and via the circuit U1 to the gate PRT1, which also becomes conducting.

The recording operations then begin by the transmission, via the control unit 49 to the decoder register 50, of an encoded binary combination representing a first character to be printed. This decoder register, which is similar to that described and shown in the aforementioned French Patent No. 2.443.335, has as many outputs, such as those designated by the symbols SA, SB, SC and SZ in FIG. 5, as there are possible types of characters to be printed. It is assumed that the number of these possible types equals t, and that accordingly this decoder register has t outputs. This decoder register is arranged to carry one of its t outputs to a positive potential each time it receives an encoded combination originating in the control unit 49, this output being the output corresponding to the character represented by that combination. For example, if the encoded combination contained in the decoder register conventionally represents the character A, the output of this register which is carried to a positive potential is the gate SA. Again, if this encoded combination conventionally represents the character B, then the output which is carried to a positive potential is the output SB, and so forth. One group comprising 35 control circuits is connected to each of the outputs of the decoder register 50. However, for reasons of simplicity, only some of the 35 circuits KA1-KA35 that are connected to the output SA are shown in FIG. 5, as well as two (KB1 and KB2) of the 35 control circuits that are connected to the output SB. The pulses that are applied to the conditioned inputs of these control circuits originate in a delay line 39 having 48 middle pickups, which beginning at a pulse transmitted by the control unit 49 and applied to its input via a conductor F produces a series of 48 pulses staggered over time. The first of these pulses is transmitted via a conductor F1 to the circuits KA1, KB1, and so forth; the second of these pulses is transmitted via a conductor F2 to the circuits KA2, KB2, etc.; and so forth for the 33 other pulses. The following pulses, which are transmitted 13 conductors F36-F48, serve as will be seen hereinafter to assure the necessary spacing between the printed characters. Since the decoder register 50 has t outputs there are accordingly a total of t groups of control circuits that are connected to these outputs, with each group including 35 control circuits. It should be noted that the bit generator 47 has 35 t inputs, each of which are connected respectively to each of these 35 t control circuits. Moreover, the bit generator 47 has w outputs and in the example described is constituted by a plane memory of the type described in French Patent No. 1.333.920; this memory contains words, each including w bits, and each of the words can be selectively extracted without erasure from this memory in response to a pulse applied to one of its 35 t inputs.

As soon as the encoded combination representing a character has been recorded in the decoder register 50, the control unit 49, via the conductor F, sends a pulse to the delay line 39. In the present example it is assumed that this encoded combination is the one for character B. In this case, the output of the decoder register 50 that is applied to a positive potential is the output SB, and consequently the circuits KB1-KB35 that are connected to this output are made conducting. In response to the pulse that is applied to its input, the delay line 39 furnishes a train of 48 pulses.

The first one of these pulses, which is sent over the conductor F1, is applied on the one hand to the conditioned inputs of the circuits KA1, KB2, and so forth, and on the other hand, via a mixer circuit G4, to the conditioned inputs of the circuit K and K4.

The same pulse is also applied via a mixer circuit G5 to the conditioned input of the circuit K1. Since as noted above the circuits KB1 and K2 are conducting, this pulse is transmitted by these two circuits, and blocked by the circuits K4 and K1. The pulse transmitted by KB1 is applied to one of the 35 t inputs of the bit generator 47. This triggers the sending, in the form of pulses, of w data bits "0" or "1" over the conductors B1-Bw.

Since as noted above the gates PRT1 and PRT3 have been made conducting, the w/2 data bits that are sent over the odd-numbered conductors B1, B3, B5, B7, and so forth are transmitted, as seen in FIGS. 3A-3D, via the gate PRT1 and sent to the row selector SRM, which then applied them to the w/2 first conductors L1, L3, L5, and so forth, which are connected to the outputs of this selector. Similarly, the w/2 data bits that are sent over the even-numbered conductors B2, B4, B6, B8, and so forth are transmitted via the gate PRT3 and sent to the row selector SRm, which then applies them to the w/2 first even-numbered conductors L2, L4, L6, and so forth that are connected to the outputs of this selector. Moreover, the pulse that is transmitted by the circuit K2 is applied on the one hand to the complementary input of the multivibrator BCP, which then changes to the "0" state, and on the other hand, via the mixer G2, to the input FP of the pulse distributor RIM. The pulse transmitted by K2 is also applied, via the mixer G1, to the input FP of the pulse distributor RIm. Under these conditions, as has been explained in detail above, the distributor RIm furnishes a pulse at its output Z1 and applies it to the input FP of the string CEM1, the effect of which is to bring about the recording of the bits carried via the conductors L1, L3, L5, and so forth into the w/2 cores, which in block M1 are located at the intersection of these conductors with the column D1. After that, the distributor RIM and the string CEM1 both advance by one increment, with the result that the next pulse that is applied to the input FP of the distributor will cause this distributor to send a pulse to its output Z3, which is thus applied to the input FP of the string CEM3.

In the same manner, in response to the pulse that is applied to its input FP, the distributor RIm furnishes a pulse at its output Z1 and applies it to the input FP of the string CEm1; this causes the recording of the bits carried by the conductors L2, L4, L6, etc. into the w/2 cores, which in block m1 are located at the intersection of these conductors with the column D1. After that, the distributor RIm and the string CEm1 both advance by one increment, with the result that the next pulse that is applied to the input FP of the distributor will cause this distributor to send a pulse to its output Z2, which is thus applied to the input FP of the string CEm2.

The changeover to the "0" state of the multivibrator BCP occurs until after the data bits that have been sent by the bit generator 47 have been transmitted via the gates PRT1 and PRT3. Because of this changeover, a positive voltage appears at the complementary output of this multivibrator. Consequently the output of the circuit E4 ceases to be carried to a positive potential, which makes the gates PRT1 and PRT3 non-conducting. Contrarily, the output of the circuit E5 is now carried to a positive voltage. This positive voltage is applied via the circuit U2 to the gate PRT2, which thus becomes conducting.

Turning now to FIG. 5, it can be seen that the second pulse sent over the conductor F2 by the delay line 39 is applied on the one hand to the conditioned inputs of the circuits KA2, KB2, and so forth and on the other, via a mixer circuit G6, to the conditioned input of the circuit K3. This same pulse is also applied via G5 to the conditioned input of the circuit K1.

Since the circuits KB2 and K3 are conducting, this pulse is transmitted by these circuits, and blocked by the circuit K1. The pulse transmitted by KB2 is applied to one of the inputs of the bit generator 47, which triggers the sending by this generator of w data bits "0" or "1" over the conductors B1-Bw.

Since the gate PRT2 (FIG. 3C) is conducting, these w bits are transmitted by this gate and sent to the row selector SRm, which then applies them to the w first conductors L1-Lw, which are connected to the outputs of this selector. Moreover, the pulse that is transmitted by the circuit K3 is applied on the on hand, via the mixer G3, to the standard input of the multivibrator BCP, which then reverts to the state "1", and on the other hand, via the mixer G2, to the input FP of the pulse distributor RIM. Under these conditions, as has been explained in detail above, the distributor RIm furnishes a pulse at its output Z2 and then advances by one increment. The pulse furnished at the output Z2 is applied to the input FP of the string CEm2, the effect of which is to bring about the recording of the w bits carried by the conductors L1-Lw into the w cores located in the block m2 at the intersection of these conductors with the column D2.

The recording of the data bits furnished by the generator 47 in response to the pulses that are sent by the delay line 39 over the other conductors F3-F35 is performed in a manner similar to what has just been described. Hence no further description of these recording operations will be provided here.

However, by the reasoning described above, it will be understood that the w/2 bits that are applied, in response to the pulse sent over F3, to the conductors L1, L3, L5, and so forth that are connected to the outputs of the selector SRM will be recorded in the w/2 cores which, in block M3, are located at the intersection of these conductors with the column D3, and that the w/2 bits that are applied, in response to this pulse sent over F3, to the conductors L2, L4, L6, and so forth that are connected to the outputs of the selector SRm are recorded into the w/2 core that in block m3 are located at the intersection of these conductors and the column D3. Similarly, the w bits that are applied, in response to the pulse sent over F4, to the conductors L1-Lw connected to the outputs of the selector SRm are recorded in the w cores that in block m4 are located at the intersection of these conductors and the column D4, and so forth.

By definition, it is understood that the 35 groups of w bits that are furnished, in response to the pulses sent over the conductors F1-F35, by the bit generator 47 are recorded successively in columns D1 of block M1 and m1, column D2 of block m2, columns D3 of blocks M3 and m3, column D4 of block M4, columns D5 of blocks M5 and m5, column D6 of block m6, and so forth; the bits of the 35th group are recorded in columns D35 of the blocks M11 and m11. These 35 groups of bits are intended for controlling the formation of magnetized points distributed in the configuration of the character B. Once the recording of these groups has been completed, the pulses that are sent by the delay line 39 over the conductors F36-F48 are sent to the distributors and scanning strings, to cause their advancement, and thus to assure the necessary spacing between the character B and the character that follows it. Under these conditions, the columns D36-D48 of the memorizing blocks do not serve to record bits furnished by the bit generator 47. After that, the control unit 49 sends a second encoded combination to the decoder register 50, representing a second character intended for being printed on the same line of characters as the first, and then, via the conductor F, it sends a pulse to the excitation control device 48.

This pulse triggers the sending by the bit generator of 35 groups of w bits intended to form the configration of this second character, and these groups of bits will be recorded in the 35 columns D49-D83 of the memorizing blocks. Then, at the end of that recording, the advancement of the distributors and of the scanning strings is commanded, so as to assure the formation of the following space.

The recording in the memorizing blocks of the groups of bits intended to form the following characters takes place similarly to what has been described above. At the end of the recording in these blocks of groups of bits corresponding to the last character of the first line of characters to be printed, the control unit 49 sends a pulse via a conductor H to the row selectors SRM and SRm. This pulse, applied to the input EP of these selectors, has the effect of shifting the switches of these selectors to their second position, so as to permit the groups of bits corresponding to the characters of the second line of characters to be recorded in the cores that in blocks m1-m12 are traversed by the w conductors located following the conductors L1-Lw, as well as in the cores that in blocks M1, M3, M5, M7, M9 and M11 are transversed by the w/2 conductors located following the w/2 first conductors L1, L3, L5, and so forth. After that, the control unit 49 commands the recording in the memorizing blocks of the groups of bits corresponding to the characters of this second line, and this recording is performed in the same manner as has been described above, while the encoded combinations representing these characters are being sent to the decoder register 50. At the end of this recording, the control unit 49 applies a new pulse to the inputs EP of the selectors SRM and SRm in order to permit the recording of the groups of bits corresponding to the characters of the third line of characters in the memorizing blocks.

These recording blocks continue until the moment when the groups of bits corresponding to the last character to be printed have been recorded in the memorizing blocks. At that moment, a new phase is triggered, in the course of which the data bits that have been recorded in the memorizing blocks are extracted from them, in order to bring about the selective excitation of the magnetic recording heads X1-Xn and Y1-Yn+1. This phase, which begins with the sending of a pulse by the control unit 49 that is then applied to the standard input of a multivibrator BFM makes use of the elements that are shown in FIGS. 4A-4D. However, prior to describing the operations performed in the course of this phase, some details relating to the structure of these elements should be given. Turning to FIGS. 4A-4D, it can be seen that the pulses that are furnished by the differential amplifier AD1 are applied to the conditioned input of a control circuit K6. This circuit K6, if it is made conducting, transmits the pulses it receives and applies them to the conditioned inputs of six control circuits KM1, KM3, KM5, KM7, KM9 and KM11; the conditioning inputs of these six circuits are each connected respectively to each of the outputs of six OR circuits U11, U12, U13, U14, U15 and U16, and each of these OR circuits includes two inputs connected to two of the 12 outputs N1-N12 of a pulse counter CIM, such that the outputs N1 and N2 are connected to the inputs of the circuit U11, the outputs N3 and N4 are connected to the inputs of the circuit U12, and so forth for the other outputs of the counter CIM. The outputs of the six control circuits KM1, KM3, KM5, KM7, KM9 and KM11 are each connected respectively to inputs AP of six scanning strings CLM1, CLM3, CLM5, CLM7, CLM9 and CLM11.

Similarly, the pulses that are furnished by the differential amplifier AD2 are applied to the conditioned input of a control circuit K7. This circuit K7, if it is made conducting, transmits the pulses that it receives and applies them to the conditioned inputs of 12 control circuits Km1-Km12, the conditioning inputs of these 12 circuits each being connected respectively to each of 12 outputs N1-N12 of a pulse counter CIm. Each of the outputs of these 12 circuits are connected respectively to each of the inputs AP of 12 scanning strings CLm1-CLm12, and the input of CLm1 is connected to the output of Km7, that of CLm2 to the output of Km8, that of CLm3 to the output of Km9, and so forth, as can be seen from FIGS. 4C and 4D.

The pulse counters CIM and CIm are of known structure and are arranged to carry only one of their outputs to a positive potential. It is assumed that prior to each operation of extracting bits that have been recorded in the memorizing blocks, these two counters have been reset to zero in a known manner; this reset to zero may be brought about, for example, by the pulse that us applied to the standard input of the multivibrator BFM. Once the counters CIM and CIm have thus been reset to zero, the output of these counters that is carried to a positive potential is the output N1. Each counter is provided with one input CP, to which the pulses to be counted are applied, and advances by one increment each time a pulse is applied to its input CP. The pulses to be counted that are applied to the input CP of the counter CIM are those that are furnished by the last output Ag of the scanning strings CLM1, CLM3, CLM5, CLM7, CLM9 and CLM11; these pulses are transmitted to this input via two input mixer circuits G7 and G9. Similarly, the pulses to be counted that are applied to the input CP of the counter CIm are those that are furnished by the last output Ak of the scanning strings CLm1-CLm12, and these pulses are transmitted via a mixer circuit G8.

When the scanning strings CLM1, CLM3, and so forth, and CLm1-CLm12 are put into action, the data bits that are extracted from the memorizing blocks are sent in the form of pulses to the recording heads X1-Xn and Y1-Yn+1, via mixer circuits GX1, GX2, ..., GXn and GY1, GY2, ..., GYn+1. It should be noted that as can be seen in FIGS. 4A-4D, the excitation of the recording head X1 is brought about by the extraction of the "1" bits that have been recorded in columns D1, D3, D5, D7, D9 and D11 of the blocks with numerals preceded by the letter M, while the excitation of the head X2 is brought about by the extraction of the "1" bits that have been recorded in columns D13, D15, D17, D19, D21 and D23 of these same blocks, and so forth for the other heads X3, X4, ..., Xn. Similarly, the excitation of the head Y2 is brought about by the extraction of the "1" bits that have been recorded in columns D7–D18 of the blocks identified by numbers beginning with the letter m. Similarly, the excitation of the head Y3 is brought about by the extraction of the "1" bits that have been recorded in columns D19–D30 of these same blocks, and so forth for the other heads Y4, Y5, ..., Yn.

It can be observed, however, that because of their positioning with respect to the drum, the heads Y1 and Yn+1 are excited only every six successive rotations of the drum. Because of this, the excitation of the head Y1 is brought about by the extraction of the "1" bits that have been recorded in columns D1–D6 of the blocks identified by a symbol beginning with m.

Similarly, the excitation of the head Yn+1 is brought about by the extraction of the "1" bits that have been recorded in columns D12n−5 through D12n of these same blocks.

Thus as indicated above, the phase in the course of which the recording heads are excited is triggered by a pulse that is applied to the standard input of the multivibrator BFM, and the effect is to cause this multivibrator to change to the "1" state. As a result, a positive voltage appears at the standard output of this multivibrator and is applied to the conditioning input of a control circuit K8, which is thus made conducting. The first pulse furnished after this changeover by the differential amplifier AD3 (recalling that this differential amplifier furnishes a pulse upon each rotation of the drum) and applied to the conditioned input of the circuit K8 is transmitted by this circuit, which then applies it both to the complementary input of the multivibrator BFM, which thus returns to the "0" state, and to the standard input of a multivibrator BCE, which then shifts to the "1" state. The positive voltage that appears under these conditions at the standard output of the multivibrator BCE is applied to one of the inputs of each of the circuits E6 and E7. Since the movable blades of the two manual contacts CM1 and CM2 have been placed at the terminals DR and GT, respectively, the other input of the circuit E6, which is connected to the terminal GT, is carried to a positive voltage. Similarly, the other input of the circuit E7, which is connected to the terminal DR, is also carried to a positive voltage. A positive voltage consequently appears at the output of the circuit E6 and is applied to the conditioning input of the circuit K6, which thus becomes conducting. Similarly, a positive voltage appears at the output of the circuit E7 and is applied to the conditioning input of the circuit K7, which thus becomes conducting. The first pulse furnished by the differential amplifier AD2 after the shift of the multivibrator BDE to "1" and applied to the conditioned input of the circuit K7 is then transmitted by this circuit, which applies it in turn to the conditioned inputs of the circuits Km1–Km12.

Similarly, the first pulse that is furnished by the differential amplifier AD1 (at the same time that it is furnished by AD2) and which is applied to the conditioned input of the circuit K6 is transmitted by this circuit, which applies it in turn to the conditioned inputs of the circuits KM1, KM3, KM5, KM7, KM9 and KM11.

Since the output N1 of each of the counters CIM and CIm is carried to a positive voltage, the circuits KM1 and Km1 simultaneously transmit the pulse that has been applied to their respective conditioned inputs; the pulse transmitted by KM1 is applied to the input AP of the string CLM1, while that transmitted by Km1 is applied to the input AP of the string CLm7. Under these conditions, the string CLM1 furnishes a pulse at its output A1 the effect of which is to extract the data bits that have been recorded in the cores located at the intersection of the first row and the columns D1, D13, D25, ..., D12n−11 of the block M1, the "1" bits thus extracted then being sent in the form of pulses to the heads X1–Xn. The "0" bits do not cause any pulse, and so it will be understood that among the heads X1–Xn, only those that receive the pulses corresponding to the extraction of the "1" bits are excited. Moreover, at the same time as the string CLM1, the string CLm7 furnishes a pulse at its output A1, the effect of which is to extract the data bits that have been recorded in the cores located at the intersection of the first row and the columns D7, D19, D31, ..., D12n−5 of the block m7, the bits thus extracted similarly bringing about the selective excitation of the heads Y2, Y3, ..., Yn+1.

The second pulse that is furnished by AD2 and is applied to the circuit K7 is transmitted by this circuit. This pulse transmitted by K7 is then transmitted by the circuit Km1, which applies it to the input AP of the string CLm7. Consequently, this string furnishes a pulse at its output A2, the effect of which is to extract the data bits that have been recorded in the cores located at the intersection of the second row and the columns D7, D19, D31, ..., D12n−5 of the block m7, the thus-extracted bits bringing about the selective excitation of the heads Y2, Y3, ..., Yn+1.

It can be observed that at the moment when the differential amplifier AD2 furnishes the second pulse, no pulse is furnished by the differential amplifier AD1, because the windows of the clock disk D are distributed in such a way that the cell PH1 is excited by light radiation at a frequency equal to one-half the excitation frequency of the cell PH2. The differential amplifier AD1 therefore furnishes a second pulse only at the moment when the differential amplifier AD2 furnishes a third pulse. The second pulse furnished by AD1 is transmitted successively by the circuits K6 and KM1 and then applied to the input AP of the string CLM1. Simultaneously, the third pulse that is furnished by AD is transmitted successively by the circuits K7 and Km1 and then applied to the input AP of the string CLm7. Consequently, the string CLM1 furnishes a pulse at its output A3, the effect of which is to extract the data bits that have been recorded in the cores located at the intersection of the second row and the columns D1, D13, D25, ..., D12n−11 of the block M1, and the extracted bits bring about the selective excitation of the heads X1–Xn. Simultaneously, the string CLm7 furnishes a pulse at its output A3, the effect of which is to extract the data bits that have been recorded in the cores located at the intersection of the third row and the columns D7, D19, D31, ..., D12n−5 of the block m7, and the extracted bits bring about the selective excitation of the heads Y2, Y3, ..., Yn+1.

The row-by-row extraction of the data bits contained in the blocks M1 and m7 thus continues in the manner described above. It can be observed that in the course of this extraction, which takes place in the course of a first rotation of the drum, the recording heads are positioned in the manner shown in FIG. 2, and accordingly, the selective excitation of the heads X1-Xn has the effect of forming magnetized points of large size on the drum surface, which are centered along the lines D1, D13, D25, . . . , D12n−11.

In the course of this first rotation, the selective excitation of the heads Y2−Yn+1 has the effect of forming magnetized points of small size on this surface, which are centered along the lines D7, D19, D31, . . . , D12n−5. The pulse that is furnished over the output Ag of the string CLM1 slightly before the end of this first rotation causes the extraction of the bits that have been recorded in the last row of the block M1, the effect of which is the selective excitation of the heads X1-Xn. This same pulse is also transmitted by the circuit G7 and applied, as seen in FIG. 4A, both to the input of a delay element R1 and via the circuit G9 to the input CP of the counter CIM. As a result, this counter CIM advances by one increment and carries its output N2 to a positive voltage. Under these conditions, the circuit KM1 remains conducting. Similarly, the pulse that is furnished at the output Ak of the string CLm7 slightly prior to the end of the first rotation causes the extraction of the bits that have been recorded in the last row of the block m7, the effect of which is the selective excitation of the heads Y2−Yn+1. This same pulse is also transmitted by the circuit G8 and applied to the input CP of the counter CIm.

This counter then advances by one increment and brings its output N2 to a positive voltage. Under these conditions, the circuit Km1 becomes non-conducting, while the circuit Km2 becomes conducting.

Moreover, the delayed pulse that at the end of the first rotation appears at the output of the element R1 is applied to the conditioned input of a control circuit K9, this circuit having its conditioning input connected to the terminal SR of the contact CM1. Since no positive voltage at all is present at this terminal, the circuit K9 is non-conducting and consequently blocks the delayed pulse that it receives.

It should be noted that at the end of the first rotation of the drum 11, the carriage 34 is displaced by one increment, with the effect of putting the heads X1, X2, . . . , Xn respectively facing the lines D2, D14, . . . , D12n−10, and the heads Y2, Y3, . . . , Yn+1 respectively facing the lines D8, D20, . . . , D12n−4. This displacement of the carriage is commanded in a known manner, for example by a pulse derived from the pulse applied to the input CP of one or the other of the counters CIM and CIm. The pulses that are sent successively by the differential amplifier AD2 when this displacement is terminated are transmitted via the circuits K7 and Km2 and applied to the input AP of the string CLm8. Consequently, the data bits that have been recorded in the block m8 are extracted from the block in the course of the second rotation of the drum and cause the selective excitation of the heads Y2−Yn+1. The pulses that are successively sent by the differential amplifier AD1 in the course of this second rotation are transmitted by the circuits K6 and KM1 and applied to the input AP of the string CLM1. In response to these pulses, the string CLM1 does furnish pulses at its outputs A1, A3, . . . , Ag, but since the "1" bits that were located in the block M1 have all been extracted in the course of the first rotation of the drum, no pulse is sent to the heads X1-Xn, which thus remain unexcited.

In the course of the second rotation of the drum, the selective excitation of the heads Y2−Yn+1 thus has the effect of forming magnetized points of small size on the drum surface, which are centered along the lines D8, D20, . . . , D12n−4.

The pulse that is furnished to the output Ag of the string CLM1 slightly before the end of this second rotation is transmitted by the circuits G7 and G9 and applied to the input CP of the counter CIM. The counter CIM then advances by one increment. Consequently, the N3 of this counter is brought to a positive potential, and the circuit KM3 is made conducting. Similarly, the pulse that is furnished by the output Ak of the string CLm8 before the end of this second rotation causes the extraction of the bits that have been recorded in the last row of block m8, the effect of which is to selectively excite the heads Y2−Yn+1. This same pulse is also transmitted by the circuit G8 and applied to the input CP of the counter CIm. This counter then advances by one increment and carries its output N3 to a positive voltage. As a result, the circuit Km3 is made conducting.

At the end of the second rotation of the drum 11, the carriage 34 is displaced by one increment, which has the effect of putting the heads X1, X2, . . . , Xn respectively facing the lines D3, D15, . . . , D12n−9, and the heads Y2, Y3, . . . , Yn+1 respectively facing the lines D9, D21, . . . , D12n−3. After that, these heads are selectively excited by the pulses furnished by the blocks M3 and m9, in response to the pulses that are sent by the differential amplifiers AD1 and AD2 and which are applied respectively to the AP inputs of the strings CLM23 and CLm9.

This excitation has the effect of forming magnetized points of large size, centered along the lines D3, D15, . . . , D12n−9, on the drum surface in the course of the third rotation, as well as magnetized points of small size that are centered on the lines D9, D21, . . . , D12n−3.

For the sake of simplicity, the operations that then ensue, and that have the effect of continuing the formation of the magnetized points on the drum surface, will not be described here. These operations are similar to those that have already been described above. By reasoning in the same manner as above, it will then be seen that in the course of the fourth rotation, magnetized points of small size are formed, and these points are centered along the lines D10, D22, . . . , D12n−2.

Similarly, in the course of the fifth rotation, the heads X1, X2, . . . , Xn form magetized points of large size centered along the lines D5, D17, . . . , D12n−7, while the heads Y2, Y3, . . . , Yn+1 form magnetized points of small size centered along the lines D11, D23, . . . , D12n−1, and so forth, for the ensuing rotations. However, it should be noted that the pulse that is furnished, slightly prior to the end of the sixth complete rotation, by the output Ak of the string CLm12 and that is applied to the input CP of the counter CIm has the effect of causing a positive voltage to appear at the output N7 of this counter and thus to make the circuit Km7 conducting. Consequently, the pulses that are sent in the course of the seventh rotation by the differential amplifier AD2 are applied to the input AP of the string CLm1. Thus it will be understood that the data bits that are extracted from the block m1 in the course of the seventh rotation serve to selectively excite the heads Y1-Yn, while the head Yn+1 is no longer excited.

This modification is nevertheless in agreement with the positioning of the heads, since beginning at the seventh rotation the head Yn+1 ceases to be located facing the drum, while the head Y1, which until then was not located facing the drum surface has finally come to face this surface. Under these conditions, in the course of the seventh rotation, the heads X1–Xn form magnetized points of large size centered on the lines D7, D19, . . . , D12n−5, while the heads Y1–Yn form magnetized points of small size centered on the lines D1, D13, . . . , D12n−11. Similarly, in the course of the eighth rotation, the heads Y1–Yn form magnetized points of small size centered on the lines D2, D14, . . . , D12n−10, and so forth.

It should be noted that the pulse that is furnished at the output Ag of the string CLm11 slightly before the end of the eleventh rotation is applied not only to the input CP of the counter CIM but also to the conditioned input of a control circuit K10 (FIG. 4B), the conditioning input of this circuit being connected to the standard output of a multivibrator BFG. Since this multivibrator is usually in the "0" state, the control circuit K10 is non-conducting, and it consequently blocks the pulse that it receives. The pulse that is furnished at the output Ag of the string CLM11 is also applied to the standard input of this multivibrator BFG, which then shifts to the "1" state, and thus makes the circuit K10 conducting. Nevertheless, this shift takes place just after the pulse that has been furnished by the string CLM11 has been applied to the circuit K10, and as a result this pulse cannot be transmitted by this circuit. Slightly before the end of the twelfth rotation, the string CLM11 again furnishes a pulse at its output Ag. This pulse is applied both to the input CP of the counter CIM an d to the conditioned input of K1O. Since K10 is now conducting, this pulse is transmitted by K10, which applies it both to the input of a delay element R2 and, via a mixer circuit G10 (FIG. 4C), to the complementary input of the multivibrator BCE, which thus returns to the "0" state. The pulse that has been furnished by the output Ag of the string CLM11 is further applied to the standard input of the multivibrator BFG, which thus remains at the "1" state. However, the delayed pulse that next appears at the output of the delay element R2 is applied to the complementary input of this multivibrator BFG, which then returns to the "0" state.

Since the multivibrator BCE has now returned to "0", no positive voltage appears at the standard output of this multivibrator and at the outputs of the circuits E6 and E7. because of this, the control circuit K6 and K7 cease being conducting. It can be noted that the return to the "0" state of the multivibrator BCE can also be brought about by the pulse furnished at the output Ak of the scanning string CLm6, this pulse being furnished to this output substantially at the same time as the one that is furnished, slightly before the end of the twelfth rotation, to the output Ag of the string CLM11.

The pulse furnished by this output Ak is in fact applied both to the input CP of the counter CIm and, via the circuit G10 to the complementary input of BCE.

It should again be noted that the positive voltage that appears at the complementary output of the multivibrator BCE when this multivibrator has returned to "0" is applied to the control unit 49 and thus constitutes a signal making it possible to inform this control unit of the end of the recording of the latent magnetic image on the drum 1. From that moment on, the unit 49 can control the motor 36 such as to put the carriage 34 in its limit position LG, and then trigger new operations, similar to those that have been described above, in order to permit the recording of another latent image on the drum.

In the case where the recording device functions by the first mode noted above, the operations that take place are similar to those described above, with the difference that he memorizing blocks m1–m12 are not put into play. In fact, the first mode is obtained by placing the movable blade of the contact CM1 on the terminal SR and the movable blade of the contact CM2 on the terminal GT. In this case, no positive voltage appears at the outputs of the circuits E1 and E3, and consequently the circuits K2, K3 and K1 are non-conducting. Contrarily, the positive voltage that appears at the output of the circuit E2 is applied both to the circuit K4, which is thus made conducting, and also, via the circuit U1, to the gate PRT1, which is thus made conducting, while the gates PRT2 and PRT3 remain non-conducting. Because of this, when the bit generator 47 is excited by the pulses sent by the excitation control device 48, the groups of w/2 bits that are carried by the conductors B1, B3, B5, B7, and so forth are sent, since the gate PRT1 is conducting, to the blocks M1, M3, M5, M7, M9 and M11, in which they are then recorded. Once the recording of all the bits necessary for forming the latent image on the drum has been completed in these blocks, the control unit 49 furnishes a pulse that when applied to the standard input of the multivibrator BFM causes this multivibrator to shift to the state "1" and makes the circuit K conducting. The pulse that is then sent by the differential amplifier AD3 and transmitted by the circuit K8 is applied to the complementary input of the multivibrator BFM, which thus returns to "0", and to the standard input of the multivibrator BCE, which then shifts to "1".

Consequently, a positive voltage appears at the output of E6, which makes the circuit K6 conducting. Contrarily, no positive voltage appears at the output of E7, since the movable blade of the contact CM1 has been placed on the terminal SR. Consequently the circuit K7 is not conducting and hence blocks the pulses furnished by AD2, while the pulses that are furnished by AD1 in the course of the first rotation of the drum are transmitted by the circuits K6 and KM1 and applied to the input AP of the string CLM1, which causes the row-by-row extraction of the bits contained in the block M1 and the selective excitation of the heads X1–Xn. Since the heads X1–Xn are then in the position shown in FIG. 2, the effect of this excitation is to form magnetized points of large size on the drum surface, centered over the lines D1, D13, D25, . . . , D12n−11. Slightly before the end of the first rotation, a pulse is furnished at the output Ag of the string CLM1. This pulse, which causes the extraction of the bits recorded in the last row of M1, is applied additionally both to the input of the delay element R1 and to the input CP of the counter CIM, which then advances by one increment. However, since the movable blade of CM1 has been positioned on the terminal SR, and the circuit K9 is thus conducting, the delayed pulse that appears slightly afterward at the output of R1 is also applied to the input CP of the counter CIM, which then advances by another increment. As a consequence of these two successive advances of the counter CIM, the output of this counter that is carried to a positive potential is the output N3, such that the circuit KM3 is made conducting. Moreover, at the end of the first rotation, the carriage 34 is displaced by two increments, and this displacement can be triggered for example by two pulses derived from those that were applied successively to the input CP of CIM. As a result, the heads X1, X2, ..., Xn are moved to face the lines D3, D15, ..., D12n−9 respectively.

In the course of the second rotation of the drum, these heads are selectively excited by the pulses furnished by the block M3, in response to the pulses sent by AD1 and transmitted by K6 and KM3 and applied to the input AP of the string CLM3. This excitation has the effect of forming magnetized points of large size on the drum surface, which are centered on the lines D3, D15, ..., D12n−9.

The operations that then take place are similar to those that have just been described. Reasoning as indicated above, it can be seen that in the course of the third rotation of the drum, the heads X1, X2, ..., Xn form magnetized points of large size centered along the lines D5, D17, ..., D12n−7. It can also be seen that in the course of the fourth rotation, the magnetized points formed are centered on the lines D7, D19, ..., D12n−5, and in the course of the fifth rotation, these points are centered on the lines D9, D21, ..., D12n−3, and in the sixth rotation these points are centered on the lines D11, D23, ..., D12n−1.

It should now be pointed out that the pulse that is furnished, slightly before the end of the sixth rotation, at the output Ag of the string CLM11 is applied not only to the input CP of the counter CIM but also to the input of the delay element R1, to the conditioned inputs of the circuits K10 and K11, and to the standard input of the multivibrator BFG, which then shifts to "1".

This pulse, blocked by K10, is transmitted by K11, which via G10 applies it to the complementary input of the multivibrator BCE, which thus returns to "0". The positive voltage that then appears at the complementary output of BCE is applied to the control unit 49 and thus informs this unit of the end of the recording of the latent magnetic image on the drum. Moreover, the delayed pulse that then appears at the output of R1 is transmitted by K9, which applies it to the input CP of the counter CIM, which has the effect of returning this counter to zero.

In the case where the recording device functions by the second mode indicated above, the operations that take place are similar to those that are performed when the device functions by the first mode, except that instead of the blocks M1, M3, M5, M7, M9 and M11, it is now the memorizing blocks m1-m12 that are put into play. This second mode is obtained by placing the movable blade of the contact CM1 on the terminal DR and the movable blade of the contant CM2 on the terminal PT. In this case, no positive voltage appears at the output of the circuits E1 and E2, and consequently the circuits K2, K3 and K4 are non-conducting. Contrarily, the positive voltage that appears at the output of the circuit E3 is applied both to the circuit K1, which is thus made conducting, and, via U2, to the gate PRT2, which is thus made conducting, while gates PRT1 and PRT3 are non-conducting. As a result, when the bit generator 47 is excited by the pulses sent by the excitation control device 48, the groups of w bits that are carried by the conductors B1-Bw are sent, since the gate PRT2 is conducting, to the blocks m1-m12, in which they are recorded. Once the recording of all the bits necessary for the formation of the latent image on the drum has been completed in these blocks, the control unit 49 furnishes a pulse that when applied to the standard input of the multivibrator BFM causes this multivibrator to shift to the state "1" and makes the circuit K8 conducting. The pulse that is then sent by AD3 and is transmitted by K8 is applied to the complementary input of the multivibrator BFM, which thus returns to "0", and to the standard input of the multivibrator BCE, which then shifts to "1". Consequently, a positive voltage appears at the output of E7, which makes the circuit K7 conducting. Contrarily, no positive voltage appears at the output of E6, since the movable blade of CM2 is placed on the terminal PT.

Consequently, the circuit K6 remains non-conducting, and so it blocks the pulses furnished by AD1, while the pulses that are furnished by AD2 in the course of the first rotation of the drum are transmitted successively by the circuits K7 and Km1, which causes the extraction, row by row, of the bits contained in the block m7 and the selective excitation of the heads Y2, Y3, ..., Yn+1. Since these heads are then in the position shown in FIG. 2, this excitation has the effect of forming magnetized points of small size on the surface of the drum, centered along the lines D7, D19, ..., D12n−5. Slightly before the end of the first rotation, a pulse is furnished at the output Ak of the string CLm7. This pulse, which causes the extraction of the bits recording in the last row of the block m7, is also applied to the input CP of the counter CIm, which then advances by one increment. Additionally, at the end of the first rotation, the carriage 34 is displaced by one increment; this displacement can for example be triggered by a pulse derived from the one applied to the input CP of the counter CIm. As a result, the heads Y2, Y3, ..., Yn+1 are put facing the lines D8, D20, ..., D12n−4, respectively. In the course of the second rotation of the drum, these heads are selectively excited by the pulses that are furnished by the block m8, in response to the pulses that have been sent by A2 and transmitted by K7 and Km2 and applied to the input AP of the string CLm8. The effect of this excitation is to form magnetized points of small size on the surface of the drum, centered along the lines D8, D20, ..., D12n−4.

Reasoning in the same manner, it can be seen that the magnetized points of small size that are formed in the course of the third rotation are centered along the lines D9, D21, ..., D12n−3; those formed in the course of the fourth rotation are centered along the lines D10, D22, ..., D12n−2; and so forth. Finally, it can be seen that the magnetized points of small size that are formed in the course of the twelfth rotation of the drum are centered along the lines D6, D18, ..., D12n−6. The pulse that is furnished at the output Ak of the string CLm6 slightly before the end of the twelfth rotation is applied not only to the input CP of the counter CIm, which causes the resetting to zero of this counter, but also, via G10, to the complementary input of the multivibrator BCE, which thus returns to "0". The positive voltage that then appears at the complementary output of BCE is applied to the control unit 49 and thus informs this unit of the end of the recording of the latent magnetic image on the drum.

It should now be noted that in order to avoid needless smearing of the transfer roller 20, the developer applicator 16 of the machine shown in FIG. 1 does not function continuously, but intermittently. More precisely, in the example described, this device 16 is commanded, in order to deposit the developer particles on the cylindrical surface of the drum, only beginning at the moment when the first magnetized points formed on this surface in the course of the final rotation (that is, in the course of the sixth or twelfth rotation, as applicable) come to travel past this device 16. This device 16 ceases being commanded as soon as the last magnetized points formed in the course of this final rotation have traveled past this applicator device. The image in powder that is formed under these conditions on the surface of the drum is transferred, when it arrives in the transfer station H, to a sheet of paper 19 furnished by the magazine 10 that has been engaged between the drum 11 and the transfer roller 20 just before the leading edge of this powdered image reaches the transfer station.

Figure 8:
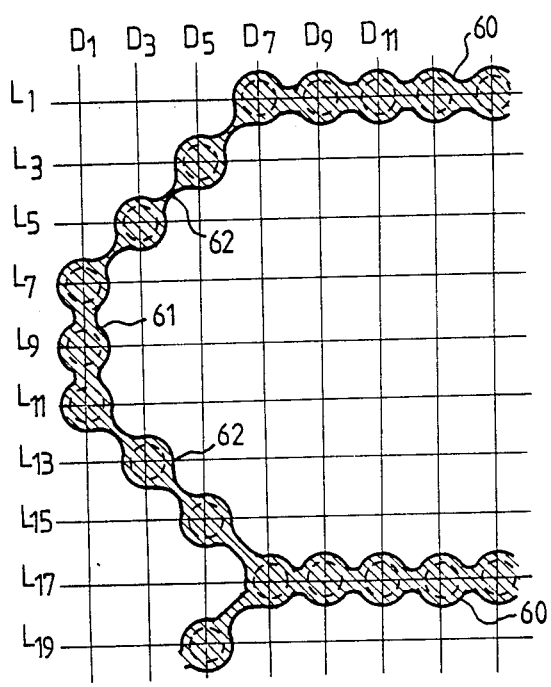
FIG. 8 shows the configuration of an image in powder obtained when the latent image forming device is used in a first mode of operation.

FIG. 8 shows the appearance of a powdered image that has been formed on the drum surface in the case where the device for forming latent magnetic images functions in the first mode described in detail above. This image, which represents a portion of the character "B", is formed by the deposit of particles of developer on magnetized points of large size, which as FIG. 8 shows are disposed at the intersections of the vertical lines D1, D3, D5, . . . , and so forth, and horizontal rows L1, L3, L5, and so forth; these lines and rows are spaced apart from one another by a distance equal to 106 μm.

It can be noted that although the horizontal lines 60 and vertical lines 61 that are part of this image in powder appear nearly regular, this is not true for the oblique lines 62 of this image; the oblique lines have an irregular width, due to the greater spacing between two adjacent magnetized points.

Figure 9:
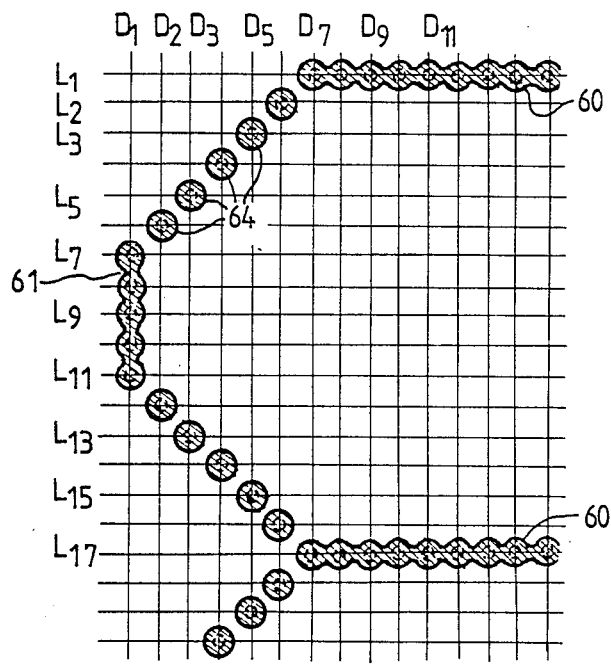
FIG. 9 shows the configuration of an image in powder obtained when the latent image forming device is used in a second mode of operation.
Figure 10:
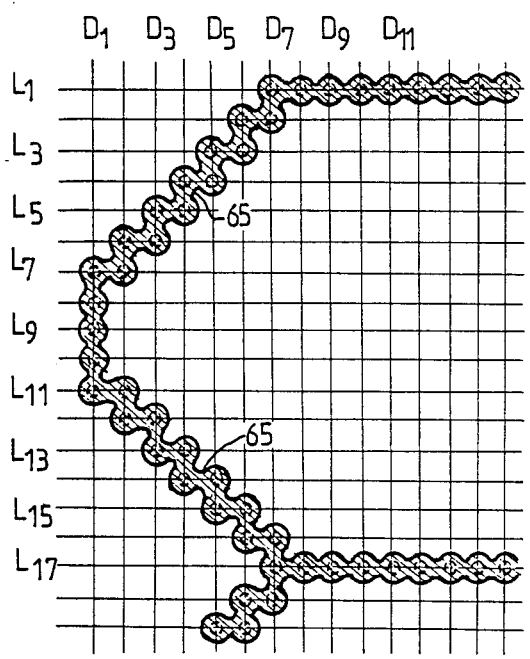
FIG. 10 shows the configuration of another image in powder obtained when the latent image forming device is used according to the second mode of operation.

Similarly, FIG. 9 shows the appearance of a powdered image that has been formed on the drum surface in the case where the device for forming latent magnetic images functions by the second mode described in detail above. This image, which represents a portion of the character "B", is formed by the deposit of particles of developer on magnetized points of small size, which as FIG. 9 shows are disposed at the intersections of the vertical lines D1, D2, D3, D4, and so forth, and horizontal rows L1, L2, L3, L4, etc.; these lines and rows are spaced apart from one another by a distance equal to 53 μm. It can be noted that the horizontal lines 60 and vertical lines 61 of this image in powder appear nearly regular, while the oblique lines comprise a succession of small mounds of powder 64 and thus are relatively lightly marked. To overcome this defect, it is possible to use not merely a single line to make each of these oblique lines, but rather a plurality of contiguous lines of magnetized points, as can be seen in FIG. 10, where each oblique line is obtained by associating two contiguous lines of magnetized points. FIG. 10, however, shows that each of the oblique lines of the image in powder is not rectilinear, but rather is in the form of a wavy line 65, which tends to make the character look deformed. This is why, in principle, the first and second modes of operation of the device for forming latent images will not be used when these images include curved or oblique lines.

Figure 11:
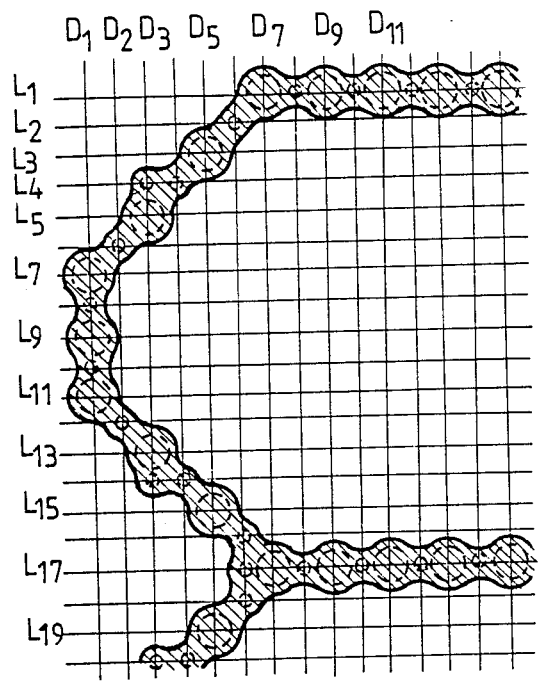
FIG. 11 shows the configuration of an image in powder obtained when the latent image forming device is used in accordance with a third mode of operation.

FIG. 11 shows the appearance of an image in powder that has been formed on the surface of the drum in the case where the device for forming latent magnetic images functions by the third mode described in detail above. This image is formed by the deposit of particles of developer on magnetized points of large and small size, the magnetized points of large size being disposed at the intersections of vertical lines D1, D3, D5, . . . , and so forth, and horizontal rows L1, L3, L5, and so forth, and the magnetized points of small size being disposed at the intersections of vertical lines D2, D4, D6, and so forth, and horizontal rows L2, L4, L6, and so forth; all of these lines and rows are spaced apart from one another by a distance equal to 53 μm. It can be observed that in this image, the horizontal and vertical lines are more regular than those of the image represented in FIG. 8, since the space included between two magnetized points of large size located on the same line or on the same row is now occupied by a magnetized point of small size. Moreover, in the image in powder that is shown in FIG. 11, the oblique lines do not suffer from the defect of irregular width that the images of FIGS. 8–10 have. It can also be observed in FIG. 11 that for an adroit disposition of magnetized points of small size, oblique lines substantially having the same width as the other lines will be obtained, yet without these oblique lines having a marked wavyness. It will then be understood that the configuration of the images, especially of characters that include curved or oblique lines, will be greatly improved.

Naturally, the invention is not limited to the modes of operation described and shown herein, which are given solely by way of example. On the contrary, they include any means comprising techniques equivalent to those described and shown, taken either singly or in combination and used in the context of the claims that follow. For example, the memorizing blocks, which in the example described are formed of memory elements having magnetic cores, can be replaced by a known type of memory elements having integrated circuits. Similarly, the row selectors SRM and SRm can be made using well-known integrated circuits, such as the SN 74 LS 541 circuits designed by TTL technology and sold by an American company, Texas Instrument Corporation; these circuits are master-controlled by SN 74 LS 154 circuits, sold by the same company.

I claim:

1. A device for forming latent magnetic images on the recording element (11) of a magnetographic printer, the recording element being driven for displacement along a predetermined direction (F) and being provided with magnetic recording tracks (D1, D2, D3, . . . ) oriented practically parallel to said direction and said tracks being spaced apart from one another by a constant pitch (p), comprising:

at least two magnetic recording heads (X1, Y1) each having a recording pole (E) the width of which differs from one head to another, the width (e1) of the largest pole being greater than the spacing pitch (p) of the tracks, the width (e2) of the narrowest pole being such that the sum (e1+e2) of the widths of the widest pole and the narrowest pole is less than twice said spacing pitch, driving means (33, 34, 35, 36) arranged to dispose said heads successively facing each of said tracks and to permit said heads, when they are selectively excited, to form magnetized points (PM1, PM2) of different sizes centered on said tracks, and a control unit means (40) for activating the heads, said control unit means being arranged to excite said heads selectively in such a manner that the magnetized points formed on the recording element do not overlap.

2. A device for forming latent magnetic images as defined by claim 1, characterized in that, with the number of tracks of the recording element (11) equal to 2fn (f and n being integers), and with the driving device including a movable support (34) capable of being displaced in a direction (T) perpendicular to the direction of displacement (F) of this recording element, the magnetic recording heads are distributed in a first series of heads including n heads of the same size (X1, X2, ..., Xn) and a second series of heads including (n+1) heads of the same size (Y1, Y2, ..., Yn, Yn+1), the size of the heads of said second series being different from that of the heads of the first series, all these heads being integrally joined with said movable support (34) and distributed regularly along it at a spacing pitch equal to fp, the heads of the second series being disposed in alternation with those of the first series, and each head of the first series being located between two heads of the second series.

3. A device for forming latent magnetic images as defined by claim 2, characterized in that, with the heads of the first series having a size greater than that of the heads of the second series, the activation control unit means (40) includes:

a data bit generator (47) provided with w output conductors (B1, B2, ..., Bw), w being an integer <n, said generator being arranged so that when it is excited it will furnish at its output on output conductors groups of data bits intended for controlling the formation on the recording element (11) of an image comprising distributed magnetized points, either inside a first type of matrix w horizontal lines and v vertical lines, spaced apart from one another by a distance equal to p (w and v are integers, with v,≦n), or inside a second type of matrix including w/2 horizontal lines and v/2 vertical lines, spaced apart from one another by a distance equal to 2p;

a first series of memorizing blocks including f blocks (M1, M3, ..., M11), each including kn/2 storage positions disposed along n columns (such as D1, D13, D25, ..., D12n−11) and k/2 rows (k being an integer at least equal to w), these k/2 rows being connected to said bit generator (47) for receiving groups of w/2 bits furnished by this generator, each of these m columns being connected respectively to each of the heads of the first series (X1, X2, ..., Xn) to permit these heads to receive the data bits, in the form of electrical pulses, which are extracted from each of these f blocks, row by row;

a first series of memorizing blocks including two f blocks (m1, m2, ..., m12), each including kn storage positions disposed along n columns (such as D1, D13, D25, ..., D12n−11), and k rows, these k rows being connected to said bit generator (47) for receiving groups of w bits furnished by this generator, each of these n columns being connected respectively to each of the heads of the second series (Y1, Y2, ..., Yn+1), except for the f last blocks for the first (Y1) of these heads and the f first blocks for the last (Yn+1) of these heads, in order to permit all of these heads to receive the data bits, in the form of electrical pulses, that are extracted from each of these two f blocks, row by row.

4. A device for forming latent magnetic images as defined by claim 3, characterized in that the output conductors of the bit generator (47) are distributed among even-numbered conductors (B2, B4, B6, ...) and odd-numbered conductors (B1, B3, B5, ...), and the activation control unit (4) further includes:

a first contact (CM1) capable of being placed in one or the other of two positions and arranged so that when it is placed in a first position it will furnish an electrical signal at a first output terminal (SR) and when it is placed in a second position it will furnish an electrical signal at a second output terminal (DR);

a second contact (CM2) capable of being placed in one or the other of two positions and arranged so that when it is placed in a first position it will furnish an electrical signal at a first output terminal (PT) and when it is placed in a second position it will furnish a electrical signal at a second output terminal (GT);

a first gate (PRT1) disposed between the bit generator (47) and the memorizing blocks of the first series (M1, M3, ..., M11) to control the transmission of the groups of w/2 data bits that are sent by this generator to these blocks, via said odd-numbered conductors (B1, B3, B5, ...), this gate being made conducting when the first contact (CM1) furnishes an electrical signal at its first output terminal (SR) and when simultaneously, the second contact (CM2) furnishes an electrical signal at its second output terminal (GT);

and a second gate (PRT2) disposed between the bit generator (47) and the memorizing blocks of the second series (m1, m2, ..., m12) to control the transmission of the groups of w data bits that are sent by this generator to the blocks, via the w output conductors (B1, B2, B3, B4, ...) of this generator, this second gate being made conducting when the first contact (CM1) furnishes an electrical signal at its second output terminal (DR) and when simultaneously the second contact (CM2) furnishes an electrical signal at its first output terminal (PT).

5. A device for forming latent magnetic images as defined by claim 4, characterized in that the activation control unit (40) further includes:

a third gate (PRT3) disposed between the bit generator (47) and the memorizing blocks of the second series (m1, m2, ..., m12) for controlling the transmission of groups of w/2 data bits that are sent by this generator to these blocks, via the even-numbered conductors (B2, B4, B6, ...);

a switch assembly (K2, K3, G3, BCP, E4, E5, U1, U2) placed under the control of the two contacts (CM1 and CM2) and arranged so that when these two contacts simultaneously furnish an electrical signal at their respective second output terminals (DR and GT), the switch assembly alternatively makes the second gate (PRT2) and the set formed by the first gate (PRT1) and the third gate (PRT3) conducting, in order to permit the groups of w bits furnished successively by the generator (47) to be sent, in alternation, solely to the blocks of the second series, and then to the blocks of both series simultaneously.

6. A device for forming latent magnetic images as defined by claim 4, characterized in that the activation control unit (40) further includes:

a first pulse generator (PH1, AD1) arranged to furnish an electrical pulse each time the recording element (11) is displaced by a length equal to twice the spacing pitch (p) of the tracks, the pulses furnished by this generator being intended to be sent to the memorizing blocks of the first series (M1, M3,..., M11) in order to bring about the extraction, row by row, of the data bits that have been recorded in these blocks;

a second pulse generator (PH2, AD2) arranged to furnish an electrical pulse each time the recording element (11) is displaced by a length equal to the spacing pitch (p) of the tracks, the pulses furnished by this generator being intended to be sent to the memorizing blocks of the second series (m1, m2, ..., m12) so as to bring about the extraction, row by row, of the data bits that have been recorded in these blocks;

and a second control group (BCE, E6, K6, E7, K7) arranged to be made active once the recording in the memorizing blocks of the data bits furnished by the bit generator (47) is completed, this control group being itself under the control of the two contacts (CM1 and CM2) and furthermore being arranged such that as soon as it is made active, it authorizes the sending, to the blocks of the first series, of the pulses furnished by the first pulse generator (PH1, AD1), in the case where the second contact (CM2) furnishes an electrical signal at its second output terminal (GT), and such that it authorizes the sending, to the blocks of the second series, of the pulses furnished by the second pulse generator (PH2, AD2), in the case where the first contact (CM1) furnishes an electrical signal at its second output terminal (DR).

7. A device for forming latent magnetic images as defined by claim 5, characterized in that the activation control unit (40) further includes:

a first pulse generator (PH1, AD1) arranged to furnish an electrical pulse each time the recording element (11) is displaced by a length equal to twice the spacing pitch (p) of the tracks, the pulses furnished by this generator being intended to be sent to the memorizing blocks of the first series (M1, M3, ..., M11) in order to bring about the extraction, row by row, of the data bits that have been recorded in these blocks;

a second pulse generator (PH2, AD2) arranged to furnish an electrical pulse each time the recording element (11) is displaced by a length equal to the spacing pitch (p) of the tracks, the pulses furnished by this generator being intended to be sent to the memorizing blocks of the second series (m1, m2, ..., m12) so as to bring about the extraction, row by row, of the data bits that have been recorded in these blocks;

and a second control group (BCE, E6, K6, E7, K7) arranged to be made active once the recording in the memorizing blocks of the data bits furnished by the bit generator (47) is completed, this control group being itself under the control of the two contacts (CM1 and CM2) and furthermore being arranged such that as soon as it is made active, it authorizes the sending, to the blocks of the first series, of the pulses furnished by the first pulse generator (PH1, AD1), in the case where the second contact (CM2) furnishes an electrical signal at its second output terminal (GT), and such that it authorizes the sending, to the blocks of the second series, of the pulses furnished by the second pulse generator (PH2, AD2), in the case where the first contact (CM1) furnishes an electrical signal at its second output terminal (DR).

8. A device for forming latent magnetic images as defined by claim 6, characterized in that the activation control unit (40) also includes:

a first group of scanning strings including f strings (CLM1, CLM3, ..., CLM11), each associated respectively with each of the f memorizing blocks of the first (M1, M3, ..., M11), each string including on the one hand an input (AP) intended to receive the pulses sent by the first pulse generator (PH1, AD1) and send under the control of the control group (BCE, EG, K6, E7, K7), and on the other hand k/2 outputs (A1, A3, ..., Ag), each connected respectively to each of the rows of the block associated with this string, each of these strings being arranged so that a second group of scanning strings including two f strings (CLm1, Clm2, ..., CLm12), each associated respectively with each of the 2f memorizing blocks of the second (m1, m2, ..., m12), each string including on the one hand an input (AP) intended to receive the pulses sent by the second pulse generator (PH2, AD2) and transmitted under the control of the control group (BCE, E6, K6, E7, K7), and on the other hand k outputs (A1, A3, ..., Ak), each connected respectively to each of the rows of the block associated with this string;

each of these strings of the first and of the second group being arranged so that in response to a pulse applied to its input (AP) it furnishes a pulse at only one of its outputs and then advances by one increment equal to the spacing pitch, so as to permit, when another pulse is applied to this input, the furnishing of a pulse at the next output of this string.

9. A device for forming latent magnetic images as defined by claim 7, characterized in that the activation control unit (40) also includes:

a first group of scanning strings including f strings (CLM1, CLM3, ..., CLM11), each associated respectively with each of the f memorizing blocks of the first (M1, M3, ..., M11), each string including on the one hand an input (AP) intended to receive the pulses sent by the first pulse generator (PH1, AD1) and send under the control of the control group (BCE, EG, K6, E7, K7), and on the other hand k/2 outputs (A1, A3, ..., Ag), each connected respectively to each of the rows of the block associated with this string, each of these strings being arranged so that a second group of scanning strings including two f strings (CLm1, Clm2, ..., CLm12), each associated respectively with each of the 2f memorizing blocks of the second (ml, m2, ..., m12), each string including on the one hand an input (AP) intended to receive the pulses sent by the second pulse generator (PH2, AD2) and transmitted under the control of the control group (BCE, E6, K6, E7, K7), and on the other hand k outputs (A1, A3, ..., Ak), each connected respectively to each of the rows of the block associated with this string;

each of these strings of the first and of the second group being arranged so that in response to a pulse applied to its input (AP) it furnishes a pulse at only one of its outputs and then advances by one increment equal to the spacing pitch, so as to permit, when another pulse is applied to this input, the furnishing of a pulse at the next output of this string.

10. A device for forming latent magnetic images as defined by claim 8 characterized in that the activation control unit (40) also includes:

a first group of f control circuits (KM1, KM3, ..., KM11), each associated respectively with each of the strings of the first group (CLM1, CLM3, ..., CLM11) and connected to the first pulse generator (PH1, AD1) to receive the pulses sent by this first generator under the control of the control group, each of these control circuits being capable of being made selectively conducting so as to transmit each of the pulses that it receives and to apply them to the input (AP) of the string with which it is associated;

a first counter (CIM) including an input (CP) and f pairs of outputs (N1, N2, ..., N12), each of these pairs of outputs (such as N1, N2) being connected respectively to each of the f control circuits of the first group so as to permit each of these circuits to be made conducting solely when an electrical signal appears at one or the other of the two outputs (N1 and N2, for example) that are connected to this circuit, the input (CP) of this counter being connected to the last output (Ag) of the scanning strings of the group to receive the pulses furnished at these outputs (Ag), this counter being arranged so as to furnish an electrical signal at only one of its two f outputs (N1, N2, ..., N12), on the one hand, and on the other hand, to advance by one increment each time a pulse is applied to its input (CP);

a second group of two f control circuits Km1, Km2, ..., Km12), each associated respectively with each of the strings of the second group (CLM1, CLm2, ..., CLm12) and connected to the second pulse generator (PH2, AD2) to receive the pulses sent by this second generator under the control of the control group, each of these control circuits being capable of being made selectively conducting so as to transmit each of the pulses that it receives and to apply them to the input (AP) of the string with which it is associated;

a second counter (CIm) including an input (CP) and two f of outputs (N1, N2, ..., N12), each of these two f outputs being connected respectively to each of the two f control circuits of the second group so as to permit each of these circuits to be made conducting solely when an electrical signal appears at the output which is connected to this circuit, the input (CP) of this second counter being connected to the last output (Ak) of the scanning strings of the second group to receive the pulses furnished at its outputs (Ak), the second counter being arranged so as to furnish an,electrical signal at only one of its two f outputs (N1, N2, ..., N12), on the one hand, and on the other hand, to advance by one increment each time a pulse is applied to its input (CP).

11. A device for forming latent magnetic images as defined by claim 9 characterized in that the activation control unit (40) also includes:

a first group of f control circuits (KM1, KM3, ..., KM11), each associated respectively with each of the strings of the first group (CLM1, CLM3, ..., CLM11) and connected to the first pulse generator (PH1, AD1) to receive the pulses sent by this first generator under the control of the control group, each of these control circuits being capable of being made selectively conducting so as to transmit each of the pulses that it receives and to apply them to the input (AP) of the string with which it is associated;

a first counter (CIM) including an input (CP) and f pairs of outputs (N1, N2, ..., N12), each of these pairs of outputs (such as N1, N2) being connected respectively to each of the f control circuits of the first group so as to permit each of these circuits to be made conducting solely when an electrical signal appears at one or the other of the two outputs (N1 and N2, for example) that are connected to this circuit, the input (CP) of this counter being connected to the last output (Ag) of the scanning strings of the group to receive the pulses furnished at these outputs (Ag), this counter being arranged so as to furnish an electrical signal at only one of its two f outputs (N1, N2, ..., N12), on the one hand, and on the other hand, to advance by one increment each time a pulse is applied to its input (CP);

a second group of two f control circuits Km1, Km2, ..., Km12), each associated respectively with each of the strings of the second group (CLM1, CLm2, ..., CLm12) and connected to the second pulse generator (PH2, AD2) to receive the pulses sent by this second generator under the control of the control group, each of these control circuits being capable of being made selectively conducting so as to transmit each of the pulses that it receives and to apply them to the input (AP) of the string with which it is associated;

a second counter (CIm) including an input (CP) and two f of outputs (N1, N2, ..., N12), each of these two f outputs being connected respectively to each of the two f control circuits of the second group so as to permit each of these circuits to be made conducting solely when an electrical signal appears at the output which is connected to this circuit, the input (CP) of this second counter being connected to the last output (Ak) of the scanning strings of the second group to receive the pulses furnished at its outputs (Ak), the second counter being arranged so as to furnish an electrical signal at only one of its two f outputs (N1, N2, ..., N12), on the one hand, and on the other hand, to advance by one increment each time a pulse is applied to its input (CP).

12. A device for forming latent magnetic images as defined by claim 10, characterized in that the activation control unit (40) also includes a delay element (R1) connected for receiving the pulses furnished at the last output (Ag) of each of the scanning strings of the first group (CLM1, CLM3, ..., CLM11) and a control circuit (K9) disposed to receive the delayed pulses furnished by this delay element and to apply them, if it is made conducting, to the input (CP) of the first counter (CIM), this control circuit (K9) moreover being connected to the first output terminal (SR) of the first contact (CM1), such that when this contact is positioned so as to furnish an electrical signal at its first output terminal, this control circuit (K9)1 is made conducting and applies the delayed pulses that it receives to the input (CP) of the first counter (CIM), when then has the effect of causing this counter to advance by two increments, instead of one increment, at the end of the extraction of the bits from each of the memorizing blocks of the first series (M1, M3, ..., M11).

13. A device for forming latent magnetic images as defined by claim 11, characterized in that the activation control unit (40) also includes a delay element (R1) connected for receiving the pulses furnished at the last output (Ag) of each of the scanning strings of the first group (CLM1, CLM3, ..., CLM11) and a control circuit (K9) disposed to receive the delayed pulses furnished by this delay element and to apply them, if it is made conducting, to the input (CP) of the first counter (CIM), this control circuit (K9) moreover being connected to the first output terminal (SR) of the first contact (CM1), such that when this contact is positioned so as to furnish an electrical signal at its first output terminal, this control circuit (K9)1 is made conducting and applies the delayed pulses that it receives to the input (CP) of the first counter (CIM), when then has the effect of causing this counter to advance by two increments, instead of one increment, at the end of the extraction of the bits from each of the memorizing blocks of the first series (M1, M3, ..., M11).

14. A device for forming latent magnetic images as defined by claim 2, characterized in that the value of f is selected equal to 6.

15. A device for forming latent magnetic images as defined by claim 3, characterized in that the value of f is selected equal to 6.

16. A device for forming latent magnetic images as defined by claim 4, characterized in that the value of f is selected equal to 6.

17. A device for forming latent magnetic images as defined by claim 5, characterized in that the value of f is selected equal to 6.

18. A device for forming latent magnetic images as defined by claim 6, characterized in that the value of f is selected equal to 6.

19. A device for forming latent magnetic images as defined by claim 7, characterized in that the value of f is selected equal to 6.

20. A device for forming latent magnetic images as defined by claim 8, characterized in that the value of f is selected equal to 6.

21. A device for forming latent magnetic images as defined by claim 9, characterized in that the value of f is selected equal to 6.

22. A device for forming latent magnetic images as defined by claim 10, characterized in that the value of f is selected equal to 6.

23. A device for forming latent magnetic images as defined by claim 11, characterized in that the value of f is selected equal to 6.

24. A device for forming latent magnetic images as defined by claim 12, characterized in that the value of f is selected equal to 6.

25. A device for forming latent magnetic images as defined by claim 13, characterized in that the value of f is selected equal to 6.

* * * * *